(12) United States Patent
Nash et al.

(10) Patent No.: US 7,178,250 B2
(45) Date of Patent: Feb. 20, 2007

(54) INTERSECTING LASER LINE GENERATING DEVICE

(75) Inventors: Derek J. Nash, Huntersville, NC (US); John C. Smith, Denver, NC (US); Jeffrey L. Spanski, Weddington, NC (US); Michael Williams, Mooresville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 182 days.

(21) Appl. No.: 10/896,298

(22) Filed: Jul. 21, 2004

(65) Prior Publication Data

US 2006/0017427 A1    Jan. 26, 2006

(51) Int. Cl.
*G01C 15/02* (2006.01)

(52) U.S. Cl. ............ 33/286; 33/290; 33/DIG. 21

(58) Field of Classification Search ............ 33/273, 33/276, 277, 278, 279, 280, 282, 283, 285, 33/286, 398, DIG. 21, 290, 291
See application file for complete search history.

(56) References Cited

U.S. PATENT DOCUMENTS

| | | | |
|---|---|---|---|
| 1,153,760 A | 9/1915 | Butler |
| 1,308,809 A | 7/1919 | Reese |
| 1,971,189 A | 8/1934 | Leibing |
| 2,187,087 A | 1/1940 | Leary |
| 2,346,773 A | 4/1944 | McBride |
| 2,431,491 A | 11/1947 | Lee et al. |
| 2,512,135 A | 6/1950 | Bridy |
| 2,600,857 A | 6/1952 | De La Mater |
| 2,759,696 A | 8/1956 | Nelson |
| 2,914,166 A | 11/1959 | Bihler |
| 3,278,843 A | 10/1966 | Deming |
| 3,446,560 A | 5/1969 | Brasier |
| 3,576,409 A | 4/1971 | Fiddler |
| 3,628,874 A | 12/1971 | Tagnon |
| 3,635,565 A | 1/1972 | Colson |
| 3,648,835 A | 3/1972 | Yucel |
| 3,662,258 A | 5/1972 | Murphy |
| 3,704,413 A | 11/1972 | Blevins |
| 3,713,614 A | 1/1973 | Taylor |
| 3,764,819 A | 10/1973 | Muller |

(Continued)

FOREIGN PATENT DOCUMENTS

DE    3246359    6/1984

(Continued)

OTHER PUBLICATIONS

International Search Report in Application No. PCT/US2004/018724, dated May 9, 2005.

(Continued)

*Primary Examiner*—G. Bradley Bennett
(74) *Attorney, Agent, or Firm*—Marshall, Gerstein & Borun LLP

(57) ABSTRACT

A line generating device generates two fan-shaped beams of light at an angle to each other, and projects the beams onto an adjacent surface, where the beams are visible as lines on the surface. A user has access to the intersection of the lines, so that the intersection can be marked or otherwise used in combination with the lines, such as in aligning objects.

63 Claims, 18 Drawing Sheets

U.S. PATENT DOCUMENTS

| | | |
|---|---|---|
| 3,805,155 A | 4/1974 | Tsuda et al. |
| 3,820,903 A | 6/1974 | Kindl et al. |
| 3,836,848 A | 9/1974 | Blevins |
| 3,847,703 A | 11/1974 | Kaiser |
| 3,897,637 A | 8/1975 | Genho |
| 3,964,824 A | 6/1976 | Dixon |
| 4,041,382 A | 8/1977 | Washburn |
| 4,067,225 A | 1/1978 | Dorman et al. |
| 4,086,528 A | 4/1978 | Walton |
| 4,099,118 A | 7/1978 | Franklin et al. |
| 4,111,564 A | 9/1978 | Trice |
| 4,130,796 A | 12/1978 | Shum |
| 4,149,320 A | 4/1979 | Troyer et al. |
| 4,221,483 A | 9/1980 | Rando |
| 4,322,678 A | 3/1982 | Capots et al. |
| 4,351,113 A | 9/1982 | Eggertsen et al. |
| 4,464,622 A | 8/1984 | Franklin |
| 4,468,860 A * | 9/1984 | Rodengen .................... 33/784 |
| 4,536,705 A | 8/1985 | Hayes |
| 4,639,666 A | 1/1987 | Strosser et al. |
| 4,676,100 A | 6/1987 | Eichberger |
| 4,686,454 A | 8/1987 | Pecukonis |
| 4,751,782 A | 6/1988 | Ammann |
| 4,752,727 A | 6/1988 | Schneider |
| 4,766,673 A | 8/1988 | Bolson |
| 4,836,699 A | 6/1989 | Babsch et al. |
| 4,847,522 A | 7/1989 | Fuller et al. |
| 4,852,265 A | 8/1989 | Rando et al. |
| 4,853,617 A | 8/1989 | Douglas et al. |
| 4,854,704 A | 8/1989 | Funazaki et al. |
| 4,859,931 A | 8/1989 | Yamashita et al. |
| 4,868,910 A | 9/1989 | Maulding |
| 4,912,851 A | 4/1990 | Rando et al. |
| 4,939,455 A | 7/1990 | Tsugawa |
| 4,942,670 A | 7/1990 | Brandt |
| 4,947,116 A | 8/1990 | Welcome et al. |
| 4,988,192 A | 1/1991 | Knittel |
| 4,992,741 A | 2/1991 | Douglas et al. |
| 4,993,161 A | 2/1991 | Borkovitz |
| 5,012,590 A | 5/1991 | Wagner et al. |
| 5,023,484 A | 6/1991 | Pathak et al. |
| 5,033,848 A | 7/1991 | Hart et al. |
| 5,108,177 A | 4/1992 | Middleton |
| 5,144,487 A | 9/1992 | Hersey |
| 5,148,108 A | 9/1992 | Dufour |
| 5,182,863 A | 2/1993 | Rando |
| 5,208,438 A | 5/1993 | Underberg |
| 5,218,770 A | 6/1993 | Toga |
| 5,243,398 A | 9/1993 | Nielsen |
| 5,264,670 A | 11/1993 | Leonard |
| 5,287,365 A | 2/1994 | Nielsen et al. |
| 5,287,627 A | 2/1994 | Rando |
| 5,307,368 A | 4/1994 | Hamar |
| 5,317,253 A | 5/1994 | Kronberg |
| 5,352,974 A | 10/1994 | Heger |
| 5,367,779 A | 11/1994 | Lee |
| 5,394,616 A | 3/1995 | Claxton |
| 5,400,514 A | 3/1995 | Imbrie et al. |
| 5,406,441 A | 4/1995 | Warda et al. |
| 5,438,265 A | 8/1995 | Eslambolchi et al. |
| 5,459,932 A | 10/1995 | Rando et al. |
| 5,481,809 A | 1/1996 | Rooney |
| 5,485,266 A | 1/1996 | Hirano et al. |
| 5,500,524 A | 3/1996 | Rando |
| 5,500,783 A | 3/1996 | Warda et al. |
| 5,524,352 A | 6/1996 | Rando et al. |
| 5,531,031 A | 7/1996 | Green |
| 5,533,268 A | 7/1996 | Keightley |
| 5,539,990 A | 7/1996 | Le |
| 5,541,727 A | 7/1996 | Rando et al. |
| 5,552,886 A | 9/1996 | Kitajima et al. |
| 5,555,137 A | 9/1996 | Whiting |
| 5,572,796 A | 11/1996 | Breda |
| 5,572,797 A | 11/1996 | Chase |
| 5,584,458 A | 12/1996 | Rando |
| 5,594,993 A | 1/1997 | Tager et al. |
| 5,606,802 A | 3/1997 | Ogawa |
| 5,610,711 A | 3/1997 | Rando |
| 5,617,202 A | 4/1997 | Rando |
| 5,619,128 A | 4/1997 | Heger |
| 5,619,802 A | 4/1997 | Rando et al. |
| 5,621,975 A | 4/1997 | Rando |
| D382,255 S | 8/1997 | Moffatt |
| 5,655,307 A | 8/1997 | Ogawa et al. |
| 5,666,736 A | 9/1997 | Wen |
| 5,666,737 A | 9/1997 | Ryan, III |
| 5,667,737 A | 9/1997 | Wittmann |
| 5,680,208 A | 10/1997 | Butler et al. |
| 5,689,330 A | 11/1997 | Gerard et al. |
| 5,742,387 A | 4/1998 | Ammann |
| 5,743,021 A | 4/1998 | Corcoran |
| 5,748,306 A | 5/1998 | Louis |
| 5,754,287 A | 5/1998 | Clarke |
| 5,754,582 A | 5/1998 | Dong |
| 5,773,971 A | 6/1998 | Tavernetti |
| 5,777,899 A | 7/1998 | Kumagai |
| 5,782,003 A | 7/1998 | Bozzo |
| 5,790,248 A | 8/1998 | Ammann |
| 5,812,057 A | 9/1998 | Hepworth et al. |
| 5,819,424 A | 10/1998 | Ohtomo et al. |
| 5,829,152 A | 11/1998 | Potter et al. |
| 5,836,081 A | 11/1998 | Orosz |
| 5,839,199 A | 11/1998 | Ogawa |
| 5,852,493 A | 12/1998 | Monnin |
| 5,864,956 A * | 2/1999 | Dong .......................... 33/227 |
| 5,872,657 A | 2/1999 | Rando |
| 5,896,102 A | 4/1999 | Heger |
| 5,900,931 A | 5/1999 | Rando |
| 5,903,345 A | 5/1999 | Butler et al. |
| 5,907,907 A | 6/1999 | Ohtomo et al. |
| 5,917,314 A | 6/1999 | Heger et al. |
| 5,917,587 A | 6/1999 | Rando |
| D412,674 S | 8/1999 | Kaiser |
| 5,946,087 A | 8/1999 | Kasori et al. |
| 5,950,321 A | 9/1999 | Pena et al. |
| 5,953,826 A | 9/1999 | Goodyer et al. |
| 5,983,510 A | 11/1999 | Wu et al. |
| 5,992,029 A | 11/1999 | Dong |
| 5,994,688 A | 11/1999 | Jackson et al. |
| 6,000,813 A | 12/1999 | Krietzman |
| 6,005,716 A | 12/1999 | Ligtenberg et al. |
| 6,005,719 A | 12/1999 | Rando |
| D419,545 S | 1/2000 | Krantz et al. |
| D419,546 S | 1/2000 | Krantz et al. |
| 6,009,630 A | 1/2000 | Rando |
| 6,012,229 A | 1/2000 | Shiao |
| 6,014,211 A | 1/2000 | Middleton et al. |
| 6,023,159 A | 2/2000 | Heger |
| 6,028,665 A | 2/2000 | McQueen |
| 6,035,540 A | 3/2000 | Wu et al. |
| 6,037,874 A | 3/2000 | Heironimus |
| 6,043,879 A | 3/2000 | Dong |
| 6,065,217 A | 5/2000 | Dong |
| 6,067,152 A | 5/2000 | Rando |
| 6,067,722 A | 5/2000 | Goodyer et al. |
| 6,069,748 A | 5/2000 | Bietry |
| D427,166 S | 6/2000 | Krantz |
| 6,073,353 A | 6/2000 | Ohtomo et al. |
| 6,073,354 A | 6/2000 | Rando |
| 6,082,013 A | 7/2000 | Peterhans |
| 6,082,875 A | 7/2000 | Kousek |
| 6,101,728 A | 8/2000 | Keng |
| 6,104,479 A | 8/2000 | Ohtomo et al. |
| 6,178,649 B1 | 1/2001 | Wu |

| Patent No. | Date | Name |
|---|---|---|
| 6,178,655 B1 | 1/2001 | Potter et al. |
| 6,188,228 B1 | 2/2001 | Philipp |
| 6,195,902 B1 | 3/2001 | Jan et al. |
| 6,198,271 B1 | 3/2001 | Heger et al. |
| 6,202,312 B1 | 3/2001 | Rando |
| 6,211,662 B1 | 4/2001 | Bijawat et al. |
| 6,215,293 B1 | 4/2001 | Yim |
| 6,249,113 B1 | 6/2001 | Krantz et al. |
| 6,259,241 B1 | 7/2001 | Krantz |
| 6,292,303 B1 | 9/2001 | Hamar |
| 6,313,912 B1 | 11/2001 | Piske et al. |
| 6,327,090 B1 | 12/2001 | Rando et al. |
| 6,351,890 B1 | 3/2002 | Williams |
| D455,430 S | 4/2002 | Krantz |
| D455,750 S | 4/2002 | Krantz |
| 6,363,622 B1 | 4/2002 | Stratton |
| 6,384,420 B1 | 5/2002 | Bozzo |
| 6,384,913 B1 | 5/2002 | Douglas et al. |
| 6,396,433 B1 | 5/2002 | Clodfelter |
| 6,427,347 B1 | 8/2002 | Butler |
| 6,430,823 B1 | 8/2002 | Seki |
| 6,449,856 B1 | 9/2002 | Matsumoto et al. |
| 6,478,452 B1 | 11/2002 | Richardson et al. |
| 6,493,952 B1 | 12/2002 | Kousek et al. |
| 6,493,954 B1 | 12/2002 | Krantz |
| D469,556 S | 1/2003 | Malard et al. |
| D470,423 S | 2/2003 | Loudenslager et al. |
| 6,513,954 B2 | 2/2003 | Ebersole |
| 6,532,676 B2 | 3/2003 | Cunningham |
| 6,536,122 B2 | 3/2003 | Tamamura |
| 6,539,638 B1 | 4/2003 | Pelletier |
| 6,542,304 B2 | 4/2003 | Tacklind et al. |
| 6,546,636 B2 | 4/2003 | Tamamura |
| 6,568,094 B2 | 5/2003 | Wu |
| 6,588,115 B1 | 7/2003 | Dong |
| 6,593,754 B1 | 7/2003 | Steber et al. |
| 6,601,309 B1 | 8/2003 | Hedström |
| 6,604,291 B2 | 8/2003 | Waibel et al. |
| 6,606,798 B2 | 8/2003 | El-Katcha et al. |
| 6,625,895 B2 | 9/2003 | Tacklind et al. |
| 6,637,124 B2 | 10/2003 | Pederson |
| 6,637,125 B2 | 10/2003 | Scarborough |
| 6,674,276 B2 | 1/2004 | Morgan et al. |
| 6,688,011 B2 | 2/2004 | Gamal et al. |
| 6,694,629 B2 | 2/2004 | Goodrich |
| 6,701,636 B2 | 3/2004 | Scarborough |
| 6,763,595 B1 * | 7/2004 | Hersey .................. 33/286 |
| 6,871,408 B2 | 3/2005 | Malard et al. |
| 6,931,737 B1 * | 8/2005 | Liao .................. 33/227 |
| 6,931,739 B2 * | 8/2005 | Chang et al. .................. 33/286 |
| 6,964,106 B2 * | 11/2005 | Sergyeyenko et al. ........ 33/286 |
| 2001/0007420 A1 | 7/2001 | Bijawat et al. |
| 2001/0010460 A1 | 8/2001 | Miller et al. |
| 2001/0022035 A1 | 9/2001 | Veloce |
| 2001/0034944 A1 | 11/2001 | Cunningham |
| 2001/0053313 A1 | 12/2001 | Luebke |
| 2002/0036768 A1 | 3/2002 | Feist et al. |
| 2002/0135347 A1 | 9/2002 | Morgan et al. |
| 2002/0162233 A1 | 11/2002 | El-Katcha et al. |
| 2002/0184773 A1 * | 12/2002 | Tamamura .................. 33/283 |
| 2003/0005590 A1 | 1/2003 | Snyder |
| 2003/0061720 A1 | 4/2003 | Waibel |
| 2003/0088993 A1 | 5/2003 | Baida |
| 2003/0101605 A1 | 6/2003 | Tacklind et al. |
| 2003/0101606 A1 | 6/2003 | Li |
| 2003/0106226 A1 | 6/2003 | Tacklind et al. |
| 2003/0110654 A1 | 6/2003 | Scarborough |
| 2003/0110655 A1 | 6/2003 | Scarborough |
| 2003/0110656 A1 | 6/2003 | Scarborough |
| 2003/0110657 A1 | 6/2003 | Scarborough |
| 2003/0145474 A1 | 8/2003 | Tacklind et al. |
| 2003/0159299 A1 | 8/2003 | Goodrich |
| 2003/0177652 A1 | 9/2003 | Sawaguchi |
| 2003/0201783 A1 | 10/2003 | Steber et al. |
| 2003/0218469 A1 | 11/2003 | Brazell et al. |
| 2003/0229997 A1 | 12/2003 | Gamal et al. |
| 2003/0231203 A1 | 12/2003 | Raskin et al. |
| 2004/0000918 A1 | 1/2004 | Sanoner et al. |
| 2004/0031163 A1 | 2/2004 | El-Katcha et al. |
| 2004/0205972 A2 | 10/2004 | Wu |

FOREIGN PATENT DOCUMENTS

| | | |
|---|---|---|
| GB | 2131908 | 6/1984 |
| GB | 2 188 432 | 9/1987 |
| GB | 2345541 | 7/2000 |
| WO | PCT WO 87/00933 | 2/1987 |
| WO | PCT WO 94/04932 | 3/1994 |
| WO | WO 98/51994 | 11/1998 |
| WO | WO-98/58232 | 12/1998 |
| WO | WO-2004/113985 | 12/2004 |

OTHER PUBLICATIONS

Written Opinion of the International Searching Authority in Application No. PCT/US2004/018724, dated May 9, 2005.

United Kingdom Search Report for United Kingdom Patent Application No. 0514904.2., dated Nov. 9, 2005.

* cited by examiner

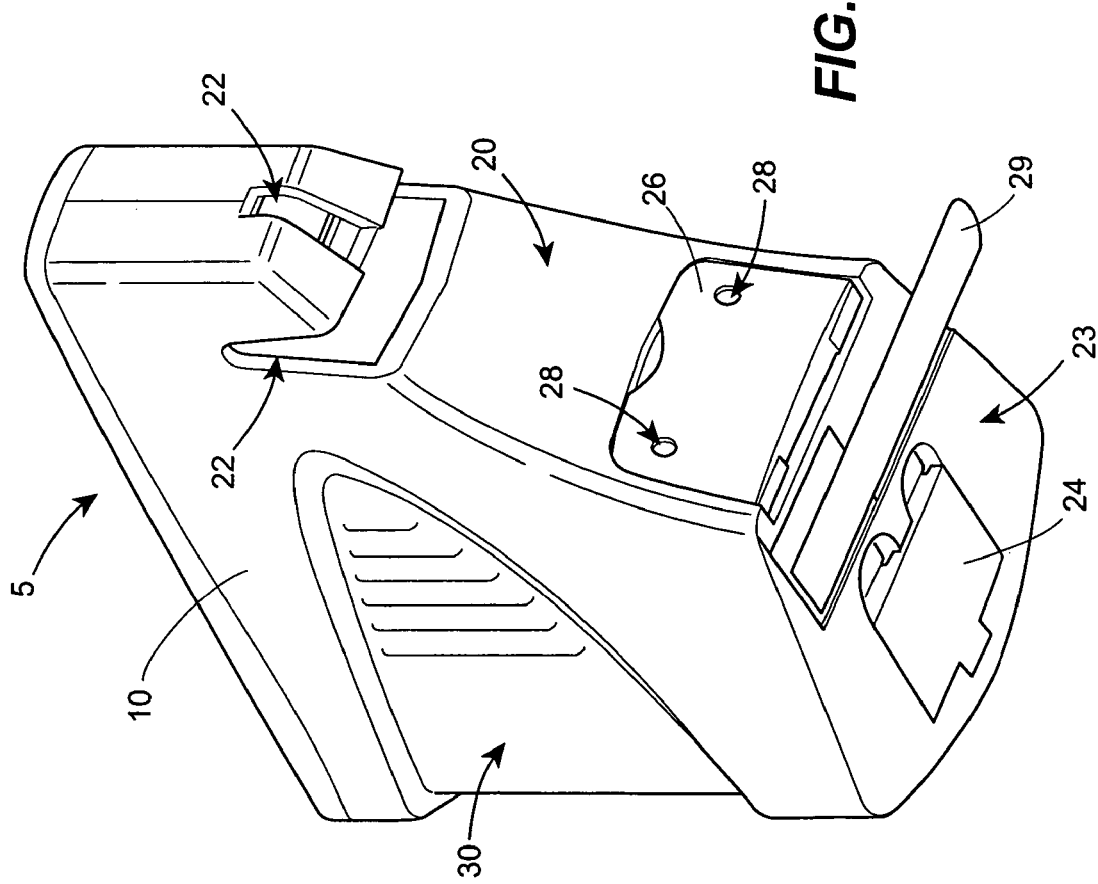

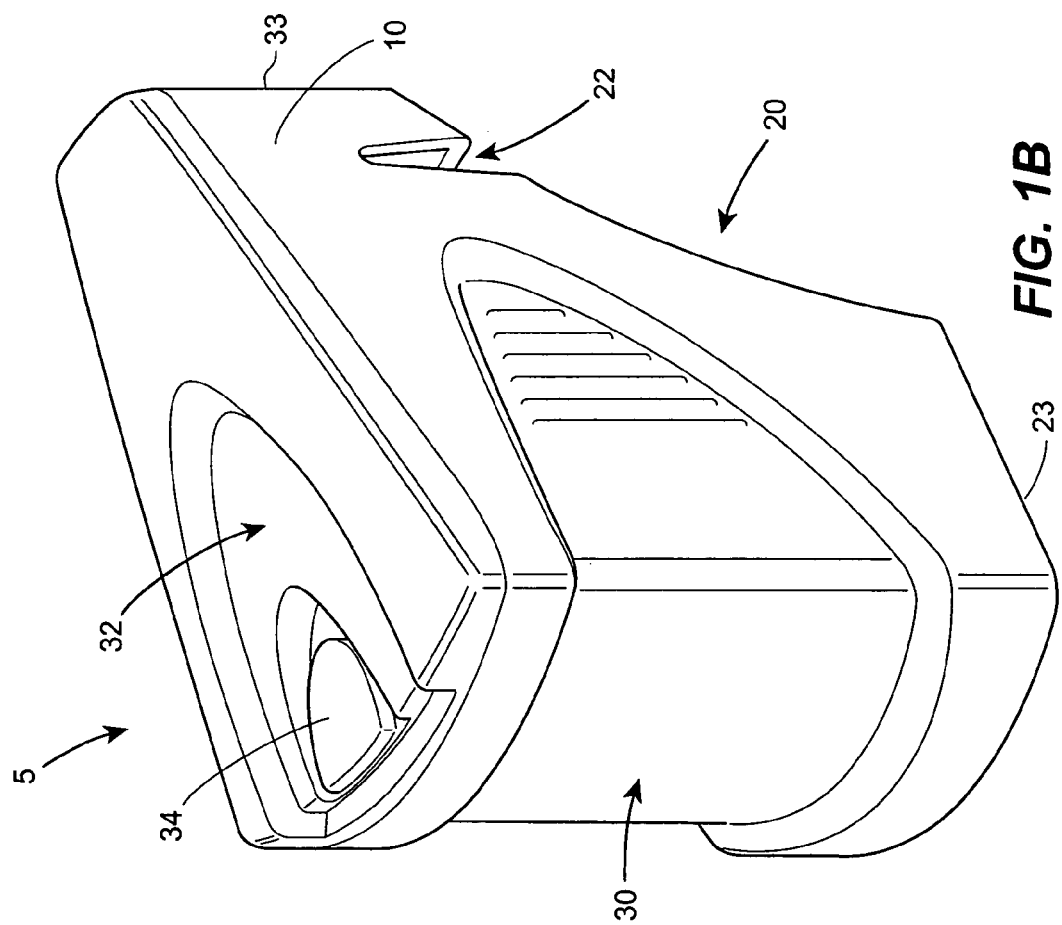

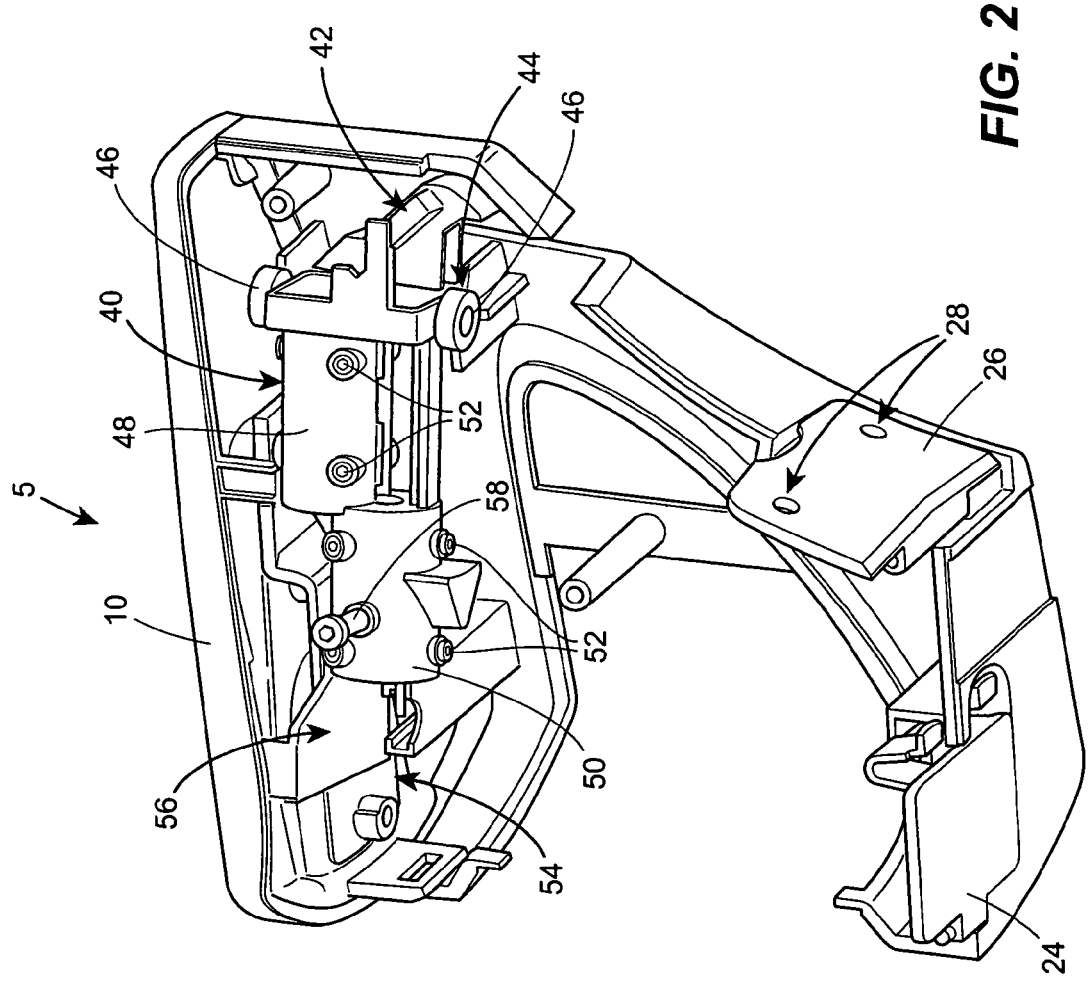

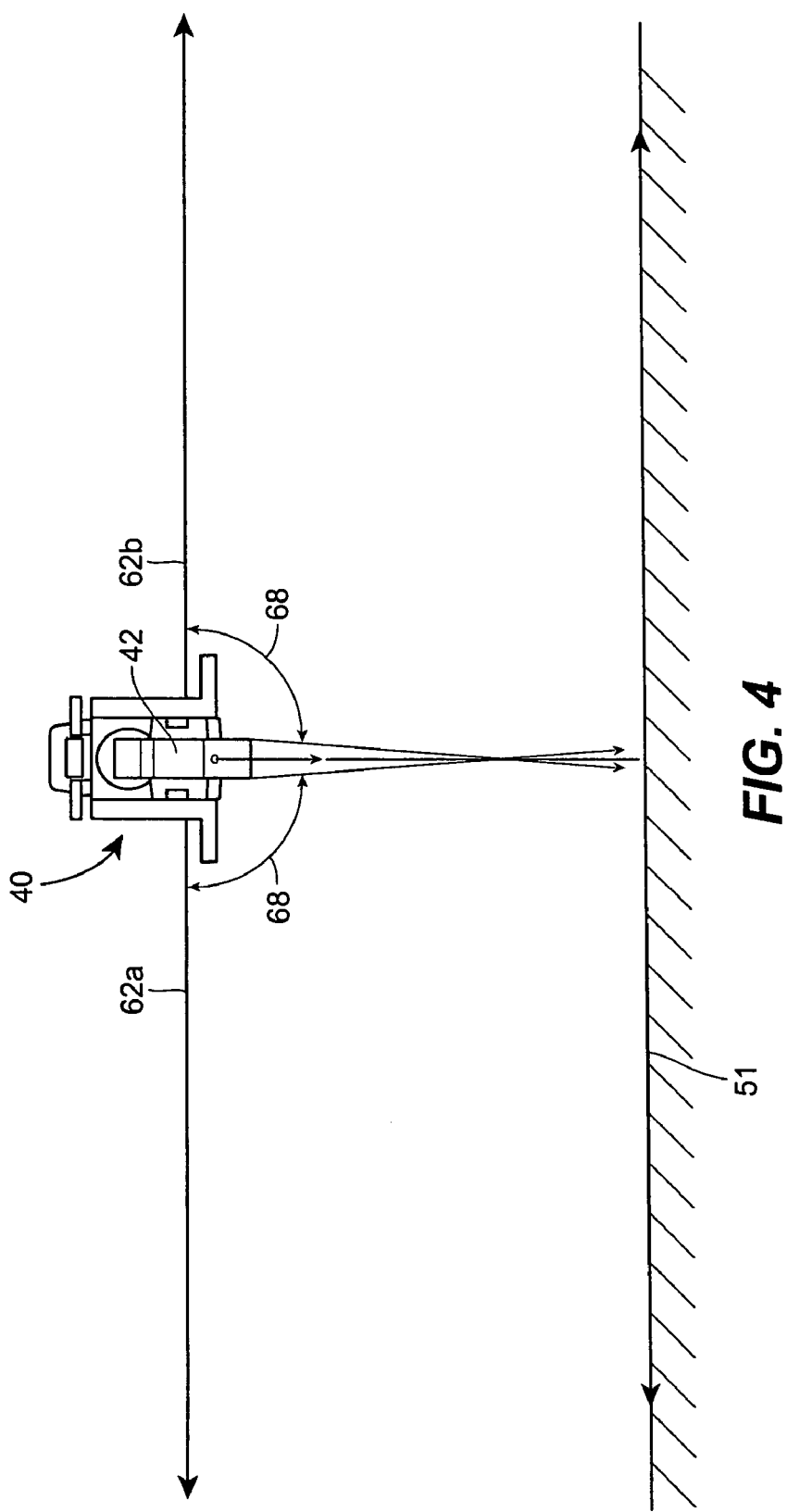

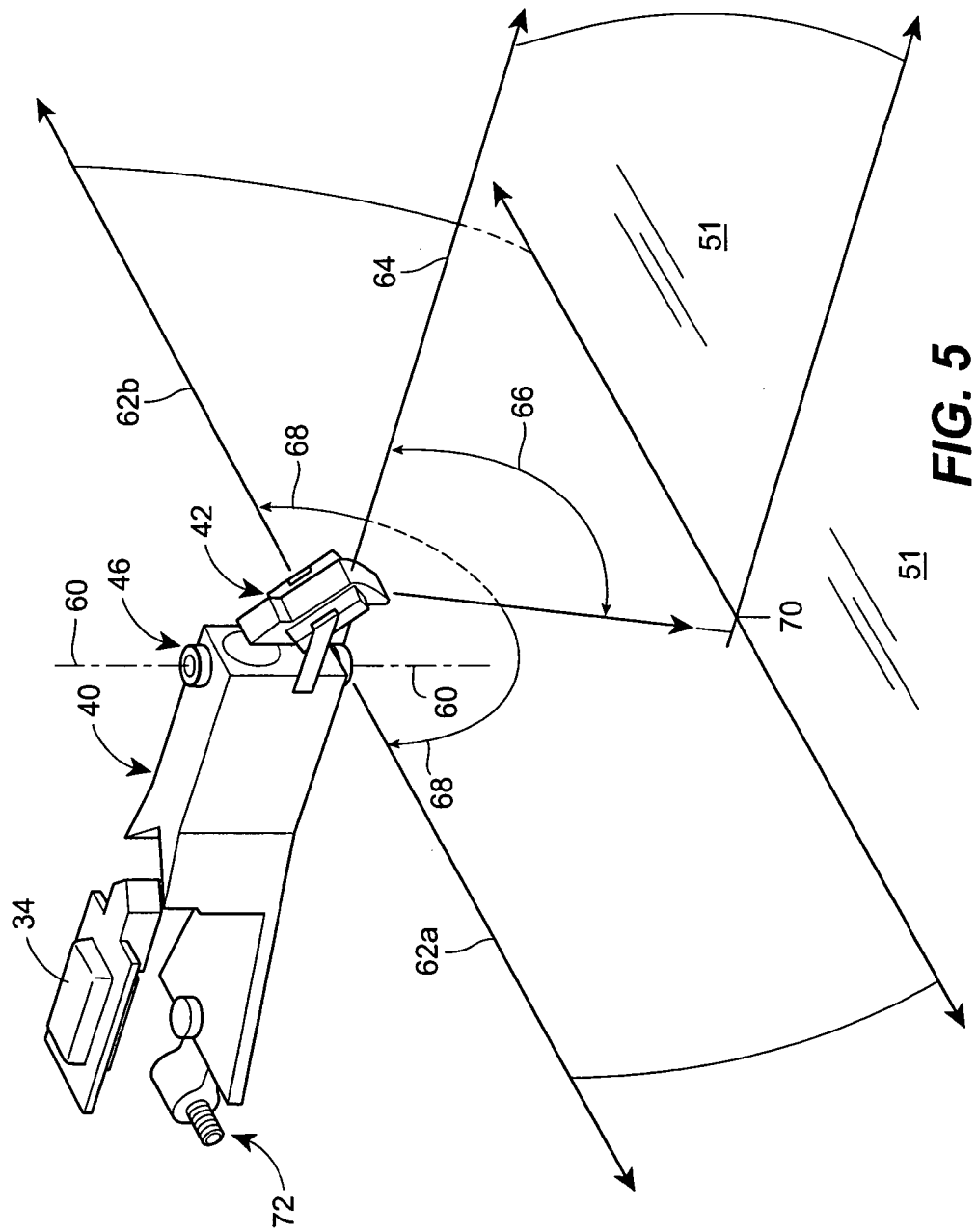

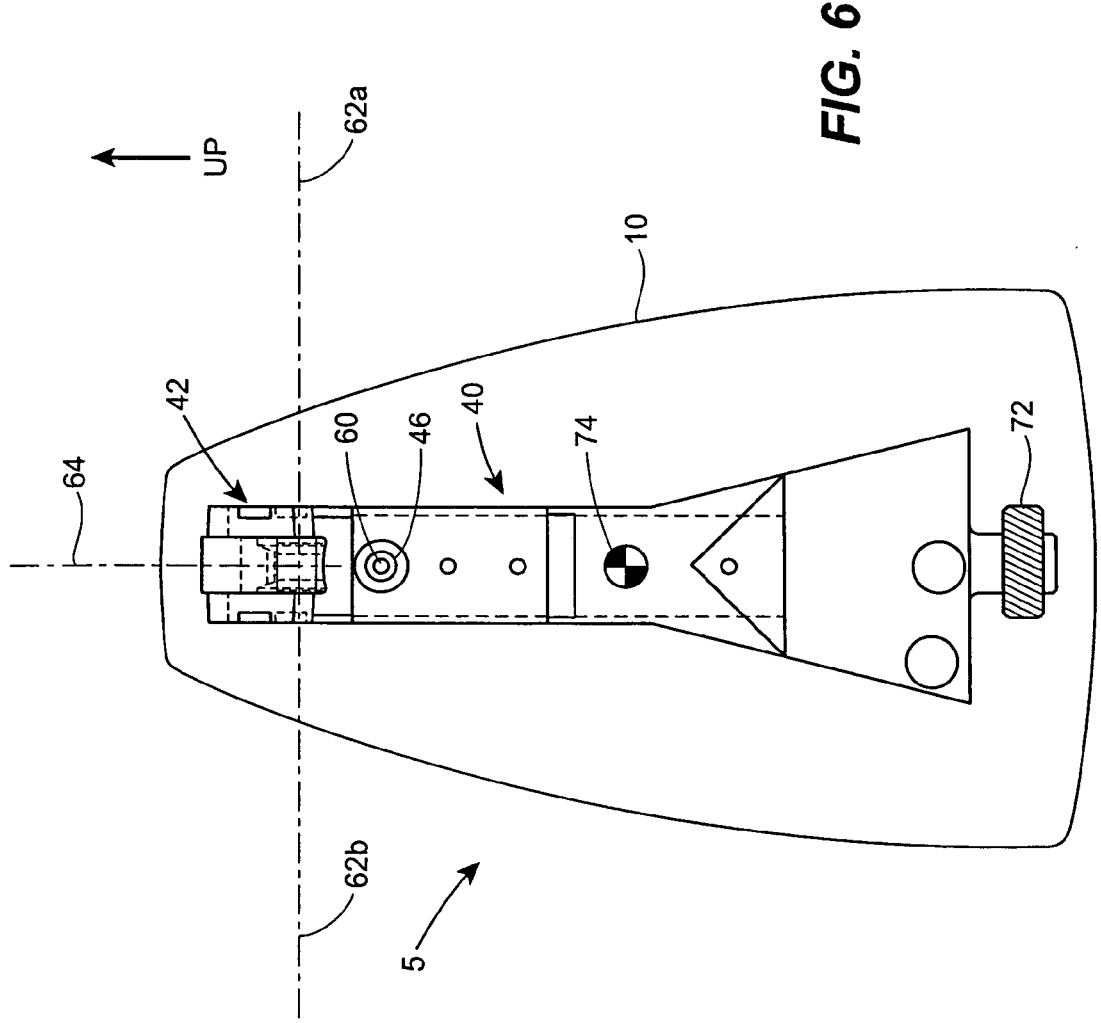

INTERSECTING LASER LINE GENERATING DEVICE

TECHNICAL FIELD

This disclosure generally relates to alignment devices and, more particularly, to an alignment device that generates two intersecting fan-shaped laser beams in a manner that allows a user to access the intersection point of the two laser beams.

BACKGROUND

Alignment of surfaces is a problem in a variety of fields, ranging from construction to interior decorating. Alignment is necessary for walls that should be perpendicular to a floor, or otherwise plumb. Masonry and brick-laying practitioners are well aware of the importance of plumbed and aligned surfaces and typically use chalk lines to achieve these results. Likewise, a home interior decorated with pictures and other wall ornamentation has a better appearance when the ornamentation is aligned. While many mechanical, electrical and laser alignment devices are available, some of these products may not be suitable for certain uses. Chalk lines, for instance, are sometimes undesirable for use in finished, interior areas.

Laser alignment devices may lack the ability to work around obstructions. That is, if a wall-hanging, such as a picture frame, interrupts the laser beam, the laser beam may be blocked from further projection. In this case, it is necessary to mark locations or heights, one by one, rather than working with the actual objects, in order to align them. Obstructions may include moldings placed in a doorway, picture frames in the way of those being aligned on one horizontal line, the operator of the device, or even textured or stuccoed surfaces on interior walls.

There are devices that direct a laser beam parallel to but away from a surface requiring alignment. A marker device or detector component may be used to sight the beam and mark corresponding locations on the wall adjacent the beam. Use of such a device requires multiple components and at least two people, one to align the laser device and another to mark the wall. Moreover, the wall itself requires marking with this method.

Another problem with aligning objects is aligning objects in two planes simultaneously. For instance, one may wish to align objects on a wall and simultaneously align their placement on the wall with respect to a feature on a floor or another wall. At the same time, a user may wish to note the location of the two planes, such as an intersection of the planes, so that the intersection point may be marked or otherwise used. Noting the location of the intersection of the two planes would make it easier for a user to mark a single location, or to mark a series of locations, in order to align objects on a wall, to site walls on a floor, or, in a general sense, to align objects on one plane with respect to one or more other planes or surfaces.

What is desired is a convenient, easy-to-level laser device that generates two or more light beams useful for aligning objects. The aligning device would preferably be lightweight and portable, and would not require an external power source for operation. The aligning device should make it easy to align objects in one plane with respect to another plane, using two intersecting beams.

BRIEF SUMMARY

An intersecting laser line generating device includes a housing, and first and second light generators mounted within the housing. The device may also include a first lens element that receives light from the first light generator and that projects the light in a first fan-shaped beam substantially within a first plane, and a second lens element that receives light from the second light generator and that projects the light in a second fan-shaped beam substantially within a second plane that intersects the first plane at an angle. The fan-shaped beams are projected outside the housing and intersect at an angle on a surface, such that a user has access to the intersection point of the fan-shaped beams on the surface.

The intersecting laser line generating device may also include a housing, a light generator, a mirror and a first and second lens element mounted within the housing. The first lens element receives light from the light generator and projects the light in a fan-shaped beam substantially within a first plane, while the second lens element receives light from the mirror and the light generator and projects the light in a fan-shaped beam substantially within a second plane. In this case, the fan-shaped beams are projected outside of the housing and intersect at an angle on a surface; such that a user has access to the intersection point of the fan-shaped beams on the surface and therefore may mark the intersection for use.

BRIEF DESCRIPTION OF THE DRAWINGS

FIG. 1A is a first isometric view of an intersecting laser line generating device illustrating a side, a front and a bottom portion of the device.

FIG. 1B is a second isometric view of the device of FIG. 1A illustrating a side, a back and a top portion of the device.

FIG. 2 is a side cutaway view illustrating internal components of the intersecting laser line generating device of FIGS. 1A and 1B.

FIG. 4 is a front view of a lens and optical chassis of the intersecting laser line generating device of FIGS. 1–3.

FIG. 5 is an isometric view of the lens, the optical chassis and a leveling lock out switch of the intersecting laser line generating device of FIGS. 1–4.

FIG. 6 is a top view of the lens and the optical chassis of the intersecting laser line generating device of FIGS. 1–5.

DETAILED DESCRIPTION

Figure 3:
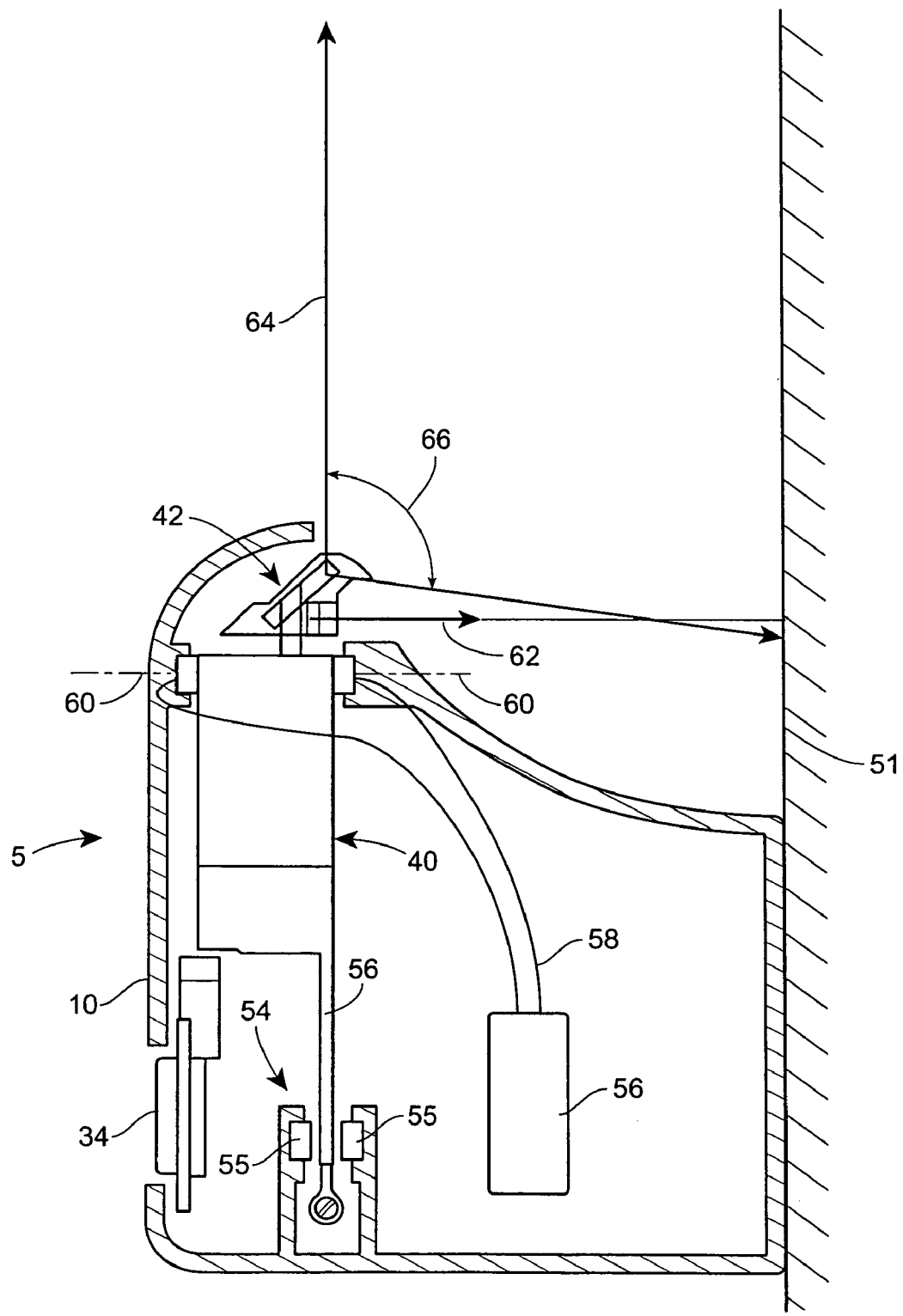
FIG. 3 is a schematic cutaway view of the intersecting laser line generating device of FIGS. 1–2 disposed on a vertical surface.

Referring to FIG. 1A, an intersecting laser line generating device 5 includes a housing 10 with a cutout or relief portion 20, which allows a user access to an intersection point of light beams projected on a working surface from the interior of the housing 10. Although the following figures and descriptions refer to light beams which intersect on a surface, the light beams may be projected on the surface wherein the light beams do not intersect, but are relatively close to each other and a user may determine where the intersection point would be. In particular, the light beams exit the housing 10 through a plurality of openings 22 which project the light beams in planes normal to the working surface. As illustrated in FIG. 1A, the housing 10 has a base 23 including a battery door 24, through which the user may access a battery compartment, and a pivotable mounting bracket 26. The mounting bracket 26 is connected to the housing 10 such that when retracted, the mounting bracket 26 is flush against the housing 10 and, when extended, the mounting bracket 26 is in the same plane as the base 23. The mounting bracket 26 contains a plurality of holes 28 through which fasteners may be placed to attach the intersecting laser line generating device 5 to the working surface in or next to the plane of the base 23. The intersecting laser line generating device 5 may also include an adhesive strip 29 affixed to the base 23 or affixed to the mounting bracket 26. The housing 10 also contains a recessed area 30 to facilitate gripping and this recessed area 30 may contain a grip enhancing surface material.

FIG. 1B is another view of the intersecting laser line generating device 5 of FIG. 1A, illustrating the housing 10, the relief or cutout portion 20 extending in a generally arcuate shape from the base 23 to a front 33 and a top recessed portion 32 which contains a switch 34. The switch 34 may be used to lock out an auto leveling feature described in detail later. However, the switch 34 may be adapted to perform a variety of functions.

FIG. 2 illustrates the internal components of the intersecting laser line generating device 5 of FIGS. 1A and 1B. In particular, the intersecting laser line generating device 5 contains an optical chassis 40 with a lens 42 mounted thereon. The optical chassis 40 and lens 42 are pivotably mounted to the interior of the housing 10 via a hinge joint 44. While the intersecting laser line generating device 5, of FIG. 2, uses two ball bearings 46 for the hinge joint 44, any means of pivotably joining the optical chassis 40 to the housing 10 may be used. The optical chassis 40 contains two laser diodes 48, 50 which generate two light beams directed at the lens 42 which transforms the laser light beams into three fan shaped beams for projection onto the working surface. The two laser diodes 48, 50 may be aimed through the use of adjusting screws 52 on the optical chassis 40. The intersecting laser line generating device 5 of FIG. 2 also includes an oscillation damping device 54 having two magnets (not shown) and a non-magnetic conductive metallic sheet 56. As the metallic sheet 56 moves through a magnetic field generated by the two magnets, small eddy currents are generated which dampen oscillations of the optical chassis 40.

In FIG. 3, the intersecting laser line generating device 5 is placed on a vertical working surface 51, such as a wall, to illustrate the working relationships between the housing 10, the optical chassis 40, the lens 42, the oscillation damping device 54, the lock out switch 34, the batteries 56 and thin gage wires 58 which connect the batteries 56 to the optical chassis 40. In particular, the thin gage wires 58 attach to the optical chassis 40 through a pivot axis 60, or as close to the pivot axis 60 as possible. The thin gage wires 58 are preferably no larger than 0.6 millimeters outer jacket diameter and may coil in opposite directions to cancel any rotational forces they may induce on the optical chassis 40.

As will be understood, light beams generated by laser diodes within the optical chassis 40 are redirected and reshaped by the lens 42, which splits a first laser light beam into two separate fan beams 62 and projects them in a horizontal plane (when mounted on a vertical surface). In addition, the lens 42 reshapes a second laser light beam into a vertical fan beam 64 which exits the lens 42 with a vertical planar angle 66 of approximately 100°. However, any vertical planar angle 66 greater than 90° may be used to ensure that the light beams 62 and 64 overlap each other and thereby prevent any gaps at the intersection of the light beams 62 and 64. Both the vertical fan beam 64 and the horizontal fan beams 62 are projected by the lens 42 in planes perpendicular to the working surface 51. As illustrated more clearly in FIG. 4, the two horizontal fan beams 62a and 62b exit the lens 42 with the respective horizontal planar exit angles 68, which are approximately 100° for the same reason the vertical planar exit angle 66 is approximately 100°.

An auto leveling feature of the intersecting laser line generating device includes the optical chassis 40 being pivotable in a plane parallel to the base 23 of the housing 10 and a center of gravity 74 of the optical chassis 40 being located between the metallic plate 56 and the pivot axis 60 (as shown in FIGS. 3 and 6). The relationship between the pivot axis 60 and the center of gravity 74 enable the optical chassis 40 to act as a pendulum, in particular, when placed on a wall with the cutout or relief portion 20 of the housing 10 facing away from a floor, the optical chassis 40 automatically plumbs itself. Because the lens 42 is mounted on the optical chassis 40, if the optical chassis 40 is plumb, the vertical fan beam 64 is also plumb (as seen in FIG. 6) and, therefore, the horizontal fan beams 62a and 62b are level.

As illustrated in FIG. 5, which is an isometric view of the optical chassis 40, the lens 42 and the lock out switch 34, laser light emerges from the optical chassis 40 and is redirected and reshaped by the lens 42. The lens 42 projects three fan beams 62a, 62b and 64 onto the working surface 51. In particular, two horizontal fan beams 62a and 62b are projected from the lens 42 in planes which are 180° offset from each other, thereby giving the appearance of a straight line on the working surface 51. Likewise, the vertical fan beam 64 is projected from the lens 42 in a plane which is 90° offset from the horizontal fan beam planes and causes an intersection point 70 of the fan beams 62a, 62b and 64 to be projected on the working surface 51. The intersection point 70 of the fan beams 62a, 62b and 64 is below the lens 42 in FIG. 5 and is below or within the area defined by the cutout or relief portion 20 of the housing 10 (shown in FIGS. 1A and 1B) allowing the user access to the intersection point 70 of the fan beams 62a, 62b and 64. The lock out switch 34 is movable and engages a cutout portion of the optical housing 40 to lock the optical housing 40 in position when the user wants to prevent the intersecting laser line generating device 5 from auto-leveling. The lock out feature implemented by the switch 34 may be used when the intersecting laser line generating device 5 is used on a horizontal working surface. A balancing screw 72 allows the user to adjust and/or fine tune a neutral position of the optical housing 40.

As shown in FIG. 6 which is a top view of the intersecting laser line generating device 5, the optical chassis 40 is pivotably mounted to the housing 10 via the ball bearings 46 and has a center of gravity 74 which is not collocated with the pivot axis 60. As oriented in FIG. 6, the optical chassis 40 will self level about the pivot axis 60 if placed within approximately 10° of plumb.

Figure 7B:
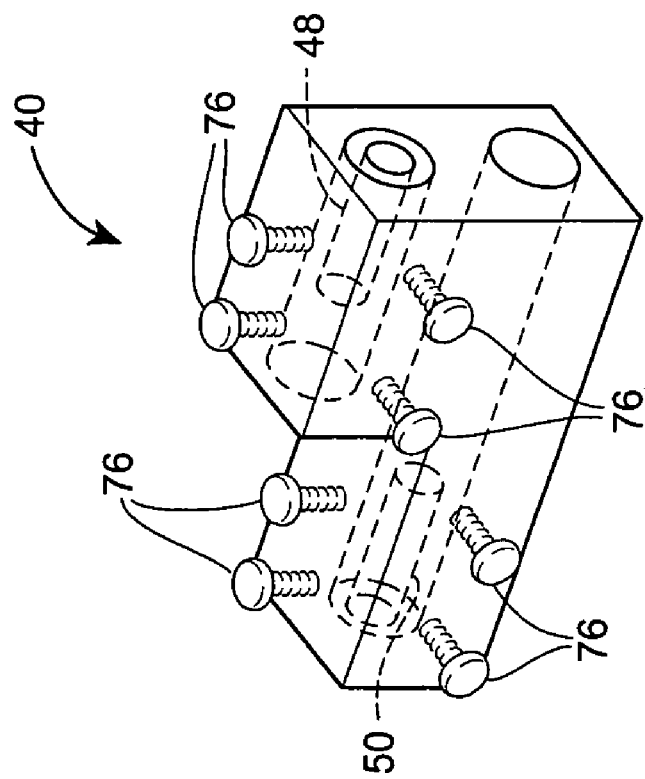
FIGS. 7A and 7B are close up views of the optical housing of the intersecting laser line generating device of FIGS. 1–6.
Figure 7A:
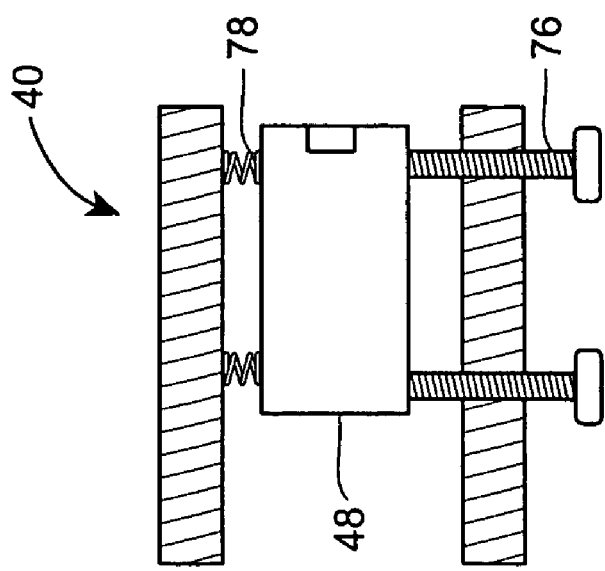

FIGS. 7A and 7B illustrate more particularly the manner in which the laser diodes 48 and 50 are mounted on the optical chassis 40. In particular, two laser diodes 48, 50 (only one is shown in FIG. 7A) are mounted to the optical chassis 40 via screws 76 and springs 78. The screws 76 may be used to adjust the aim of the laser diode 48, 50 to optimize the interaction of the laser light beam on the lens 42. Although screws 76 and springs 78 are shown, any mechanism for adjusting the aim of the laser diodes may be used, for example, elastic spacing members may be used instead of springs. As illustrated in FIG. 7B, the optical chassis 40 contains both vertical and horizontal adjustment screws 76 for each laser diode 48, 50, and both laser diodes 48, 50 may be aimed by adjusting the screws 76 separately or together.

Figure 8:
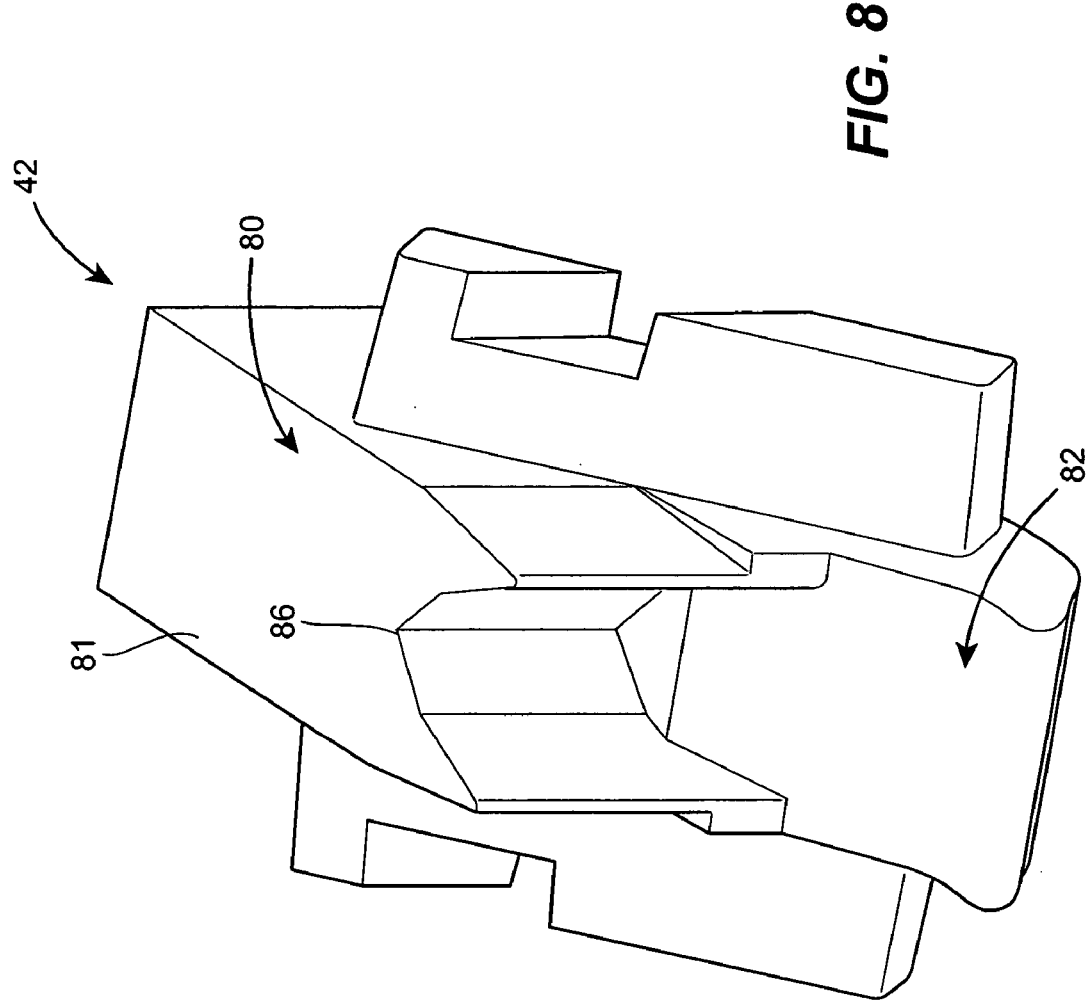
FIG. 8 is an isometric close up view of the lens of the intersecting laser line generating device of FIGS. 1–6.
Figure 9:
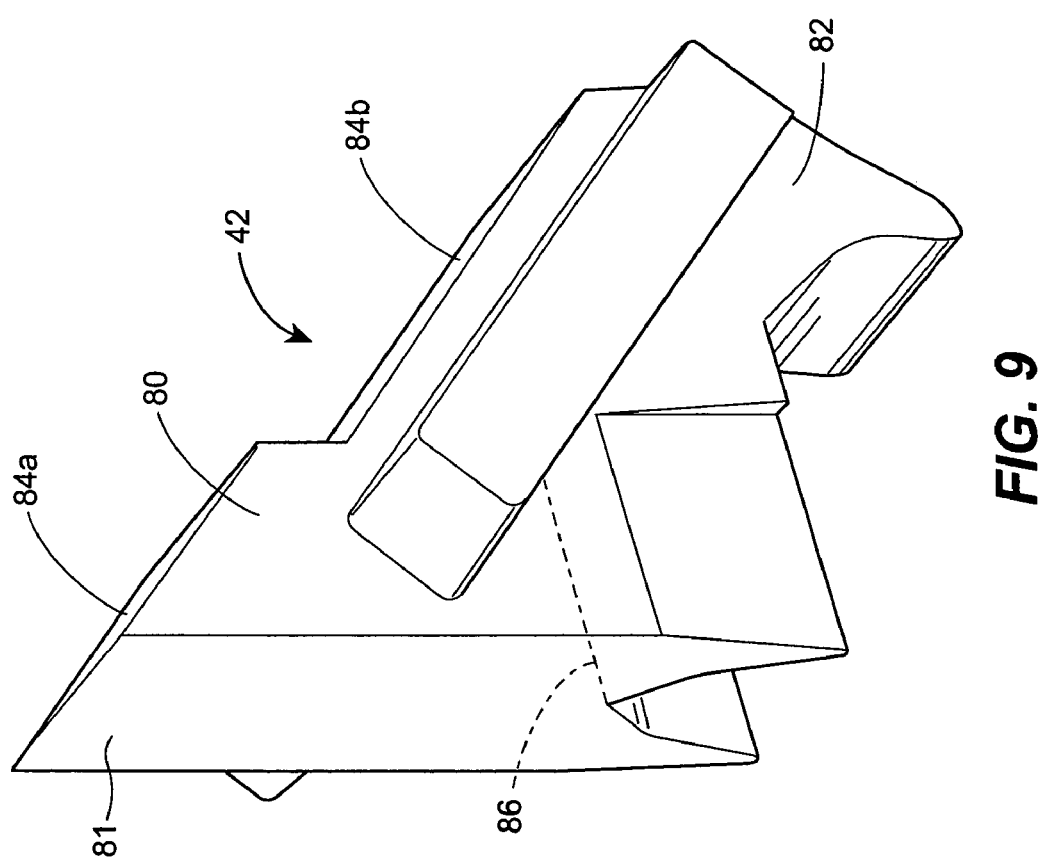
FIG. 9 is a second isometric close up view of the lens of the intersecting laser line generating device of FIGS. 1–6.

FIGS. 8 and 9 illustrate the lens 42 of the intersecting laser line generating device of FIGS. 1–6 in more detail. The lens 42 includes a horizontal beam portion 80, a vertical beam portion 82 and reflective portions 84a and 84b (shown best in FIG. 9). Generally speaking, the light beams enter the lens 42 through an entry surface 81 which slightly refracts the light beam which, in turn, slightly increases the angle of incidence relative to surfaces 84a and 84b. The entry surface 81 of FIGS. 8 and 9 is a plano surface which may be inclined at slight angle to the incoming light beams. However, the entry surface 81 may be plano, convex or concave, depending on the orientation of the light beams and the lens elements and, in addition, the entry surface 81 may be disposed at any angle in relation to the incoming light beam such that the refraction may enhance the reflectivity of the reflective surfaces 84a and 84b. Further, the reflective portion 84a redirects the laser light from the first laser diode 48 into a plane perpendicular to the working surface. The laser light from the first laser diode 48 then enters the horizontal beam portion 80 of the lens 42 and is split into two beams at a splitting line 86. The split beams continue through their respective sides of the horizontal beam portion 80 of the lens 42 which reshapes the beams into fan shaped beams 62a and 62b and projects the fan shaped beams 62a and 62b out of the lens 42 onto the working surface. The vertical beam portion 82 of the lens 42 both redirects and reshapes the laser light beam from the second laser diode 50, projecting a fan shaped beam 64 onto a working surface 51.

Figure 10:
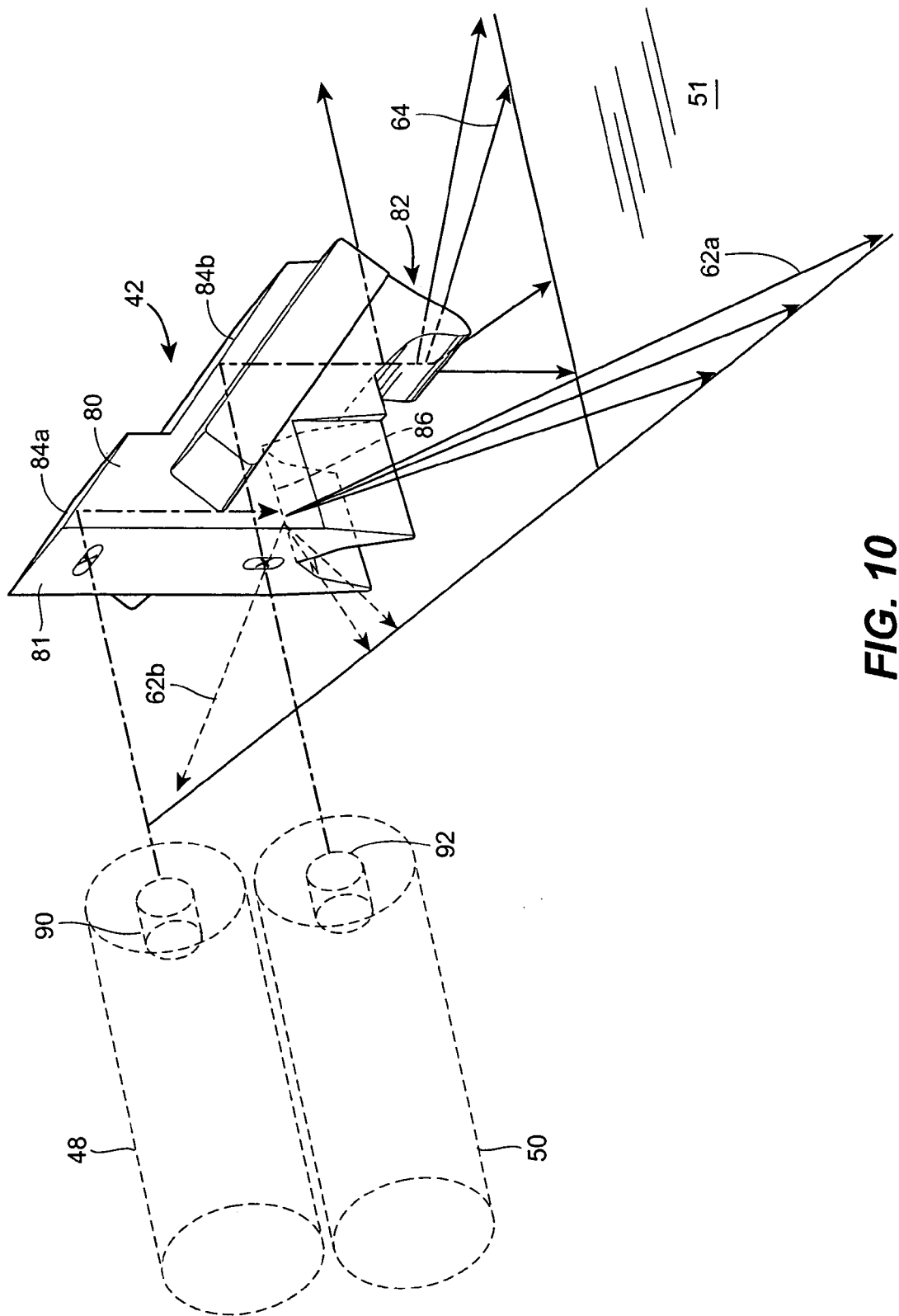
FIG. 10 is an isometric view of two laser light generators and the lens of the intersecting laser line generating device of FIGS. 1–6, illustrating the interaction of two laser light beams with the lens.
Figure 11B:
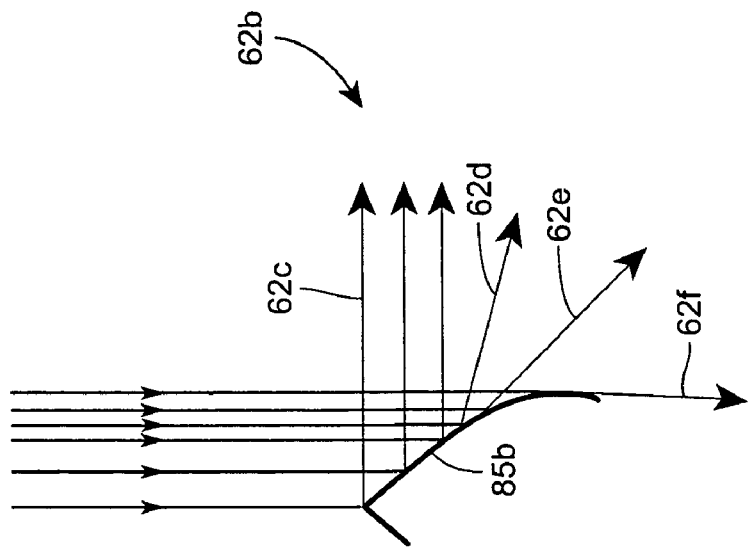
FIGS. 11A and 11B are cross-sectional views of a horizontal beam portion of the lens of FIG. 10.
Figure 11A:
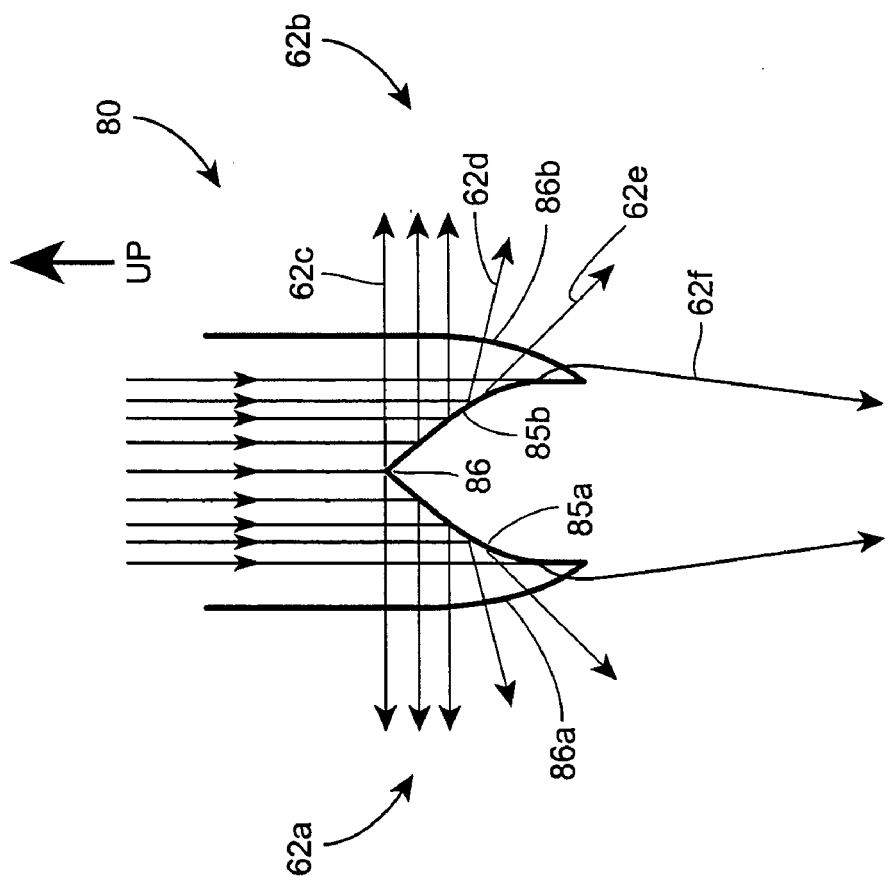

FIG. 10 illustrates in more detail the interaction of the laser light beams and the lens 42 of the intersecting laser line generating device of FIGS. 1–6. In particular, the laser light beams generated by the laser diodes 48 and 50 are focused by two focusing lenses 90 and 92 before interacting with the lens 42. A first reflective surface 84a redirects the light from the first laser diode 48 from a plane substantially parallel to the base 23 (FIG. 1A) into a plane substantially perpendicular to the base 23. Referring now to FIGS. 11A and 11B, the redirected light beam from the first laser diode 48 continues in the lens 42 until encountering total internal reflective surfaces 85a and 85b which split and reshape the beam into two beams 62a and 62b which are fan shaped. The total internal reflective surfaces 85a and 85b generate approximately 90° of the planar exit angle 68 (as seen in FIG. 5). If the angle of incidence is less than what would be required for a total internal reflective surface, the surface may be coated with a reflective material. A refractive surface 86a and 86b further increases the planar exit angle 68 to approximately 100°.

Figure 12:
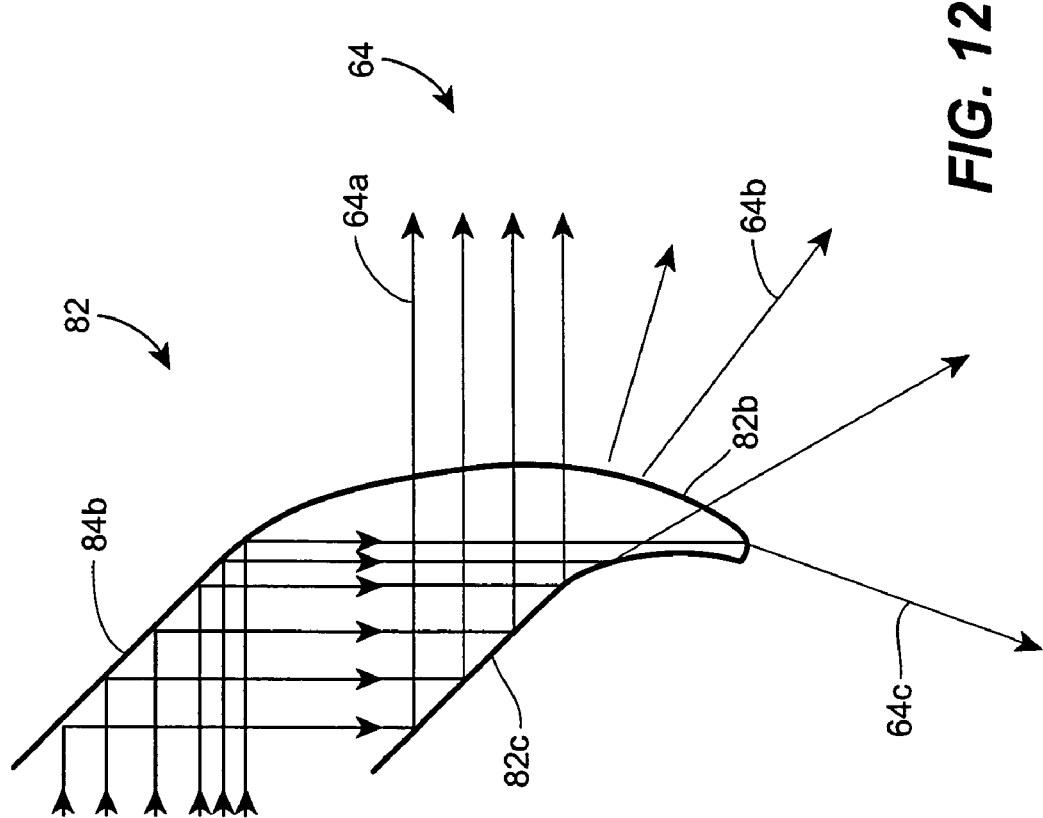
FIG. 12 is a cross-sectional view of a vertical beam portion of the lens of FIG. 10.

Referring again to FIG. 10, a second reflective surface 84b redirects the light from the second laser diode 50 from a plane substantially parallel to the base 23 (FIG. 1A) into a plane substantially perpendicular to the base. As shown in Fin. 12, the redirected light beam from the second laser diode 50 continues in the lens 42 until encountering a second total internal reflection surface 82c (as seen in FIG. 12) which generates an approximately 90° planar exit angle 66 (as seen in FIG. 5). A refractive surface 82b further increases the planar exit angle 66 to approximately 100°.

Referring again to FIG. 10, because the light from the first laser diode 48 is split into two separate beams when passing through the horizontal beam portion 80 of the lens 42, the projected light may appear dimmer than the light projected from the second laser diode 50 on the working surface 51. To compensate for this effect, a more powerful laser or a different wavelength of laser light may be used. For example, 650 nm wavelength light may be used for the second laser diode 50 while 635 nm wavelength light may be used for the first laser diode 48. The 635 nm wavelength is closer to an optimum wavelength for perception by the human eye. Therefore, the 635 nm light is perceived as approximately four times brighter, even though it is the same intensity, as the 650 nm wavelength light. Because the 635 nm light is perceived as brighter, the laser light beam from the first laser diode 48 may be split without losing any perceived intensity. By using the different wavelength of light as opposed to a higher intensity light, battery life may be extended and internal circuitry may be simplified.

Still further, the lens 42 of FIGS. 8–10 is designed to deliver the greatest intensity light at the projection points furthest from the intersecting laser line generating device. As a result, the light intensity directly below the device is less than the light intensity further away. This light intensity distribution creates a line on the working surface 51 which may be perceived as having substantially the same brightness over a substantial portion of its usable length. If the intensity of light was uniform upon exit, the line projected on the working surface 51 would fade the further away from the device the line was projected. This is known as the cosine of the angle law, which states that when the surface of illumination is tilted (with respect to the direction of maximum radiance of a light source), as is the case with the embodiments of FIGS. 1–6, the light will be spread over a greater area, reducing the illumination in the ratio of the area of one plane to the area of another plane. The ratio is equal to the cosine of the angle of incidence. To overcome the cosine of angle law, the lens 42 optimizes the light intensity over the horizontal planar exit angle 68 and the vertical planar exit angle 66.

The curvature of the total internal reflective surface 85a or 85b in FIG. 11A determines most of the horizontal planar exit angle 68 of the fan beams 62a and 62b and also affects the intensity of the beam in each portion of the fan. Relative to the projection surface, the angle of incidence for the top portion of the fan beam 62c is more than that of the middle portions of the fan beam 62d and 62e which, in turn, have an angle of incidence more than the bottom portion of the fan beam 62f. As discussed above, the cosine of the angle law determines the relative intensity of the light beam at the bottom of the fan 62f is less than the relative intensity of the top part of the fan 62c. Because the top part of the fan 62c corresponds to the part of the fan beam which is projected furthest away from the intersecting laser line generating device 5 and the bottom part of the fan 62f corresponds to the part of the fan beam which is projected closest to the intersecting laser line generating device 5, the laser lines 62a and 62b projected on the working surface may appear to have a substantially similar brightness across their entire usable lengths.

As illustrated in FIG. 12, the vertical fan beam portion 82 of the lens 42 accomplishes the reshaping of the vertical fan beam in much the same way as the horizontal fan beam portion 80. The curvature of the total internal reflective surface 82c imparts a planar exit angle of approximately 90° on the vertical beam and distributes the intensity of the vertical beam in the same way as the horizontal beam portion 80. Thus, the beam intensity of the top of the beam 64a is greater than the intensity in the middle of the beam 64b which is, in turn, greater than the intensity in the bottom of the beam 64c.

Figure 13:
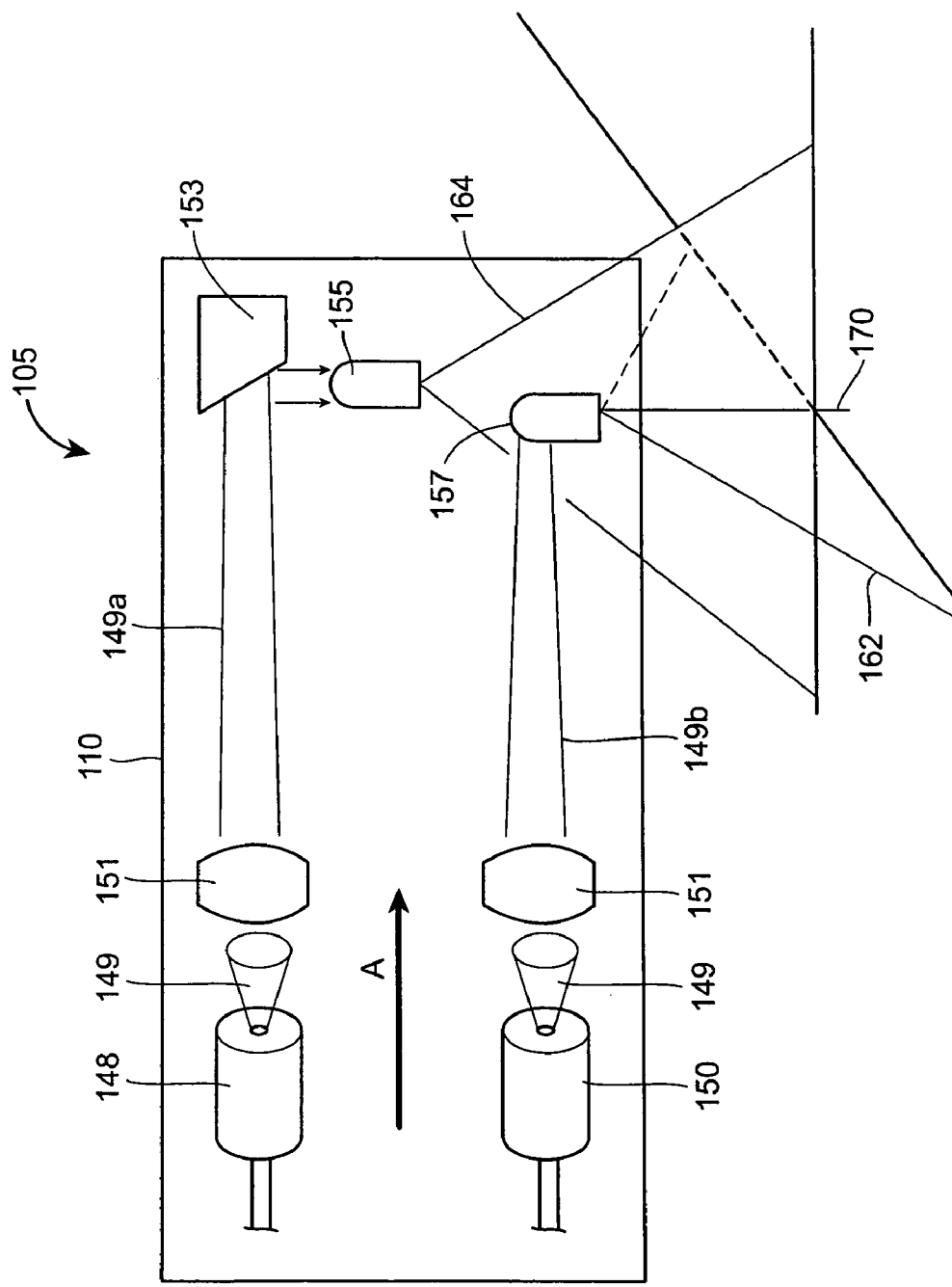
FIG. 13 is a schematic view of an alternate embodiment of an intersecting laser line generating device.

FIG. 13 presents a side view of an alternate embodiment of an intersecting laser line generating device 105 which includes a housing 110 and two laser diodes 148, 150 mounted within the housing 110. Each laser diode 148, 150 produces laser light 149 which emerges in a cone shape, diverging rapidly in the direction of propagation, as shown by arrow A. A biconvex lens 151 focuses the light into a beam 149a, 149b having an elliptical cross-section. The elliptical cross-section typically has a major axis and a minor axis, and the beams 149a and 149b may have about a three-to-one ratio in terms of width to height. A biconvex lens is an example of a converging lens.

In comparison to the source of light at the laser diode, the beam may have a relative "divergence" of about 8° in a first axis and about 27° in a second axis perpendicular to the first axis. Once the light leaves the biconvex lens 151, however, it is no longer diverging, but is focused. Beams 149a, 149b are shown in an exaggerated converging focus as they leave lenses 151 and travel further in the system. The light 149a and 149b may be focused and non-diverging or may be converging as shown, in order to preserve the desired cross-sectional shape of the ellipse. Other cross-sections may be achieved, such as a round cross-section. The light 149a is reflected from a mirror 153 onto a convex lens 155 which focuses the light into a fan-shaped beam 164. In the lower portion of FIG. 13, light beam 149b strikes convex lens 157 and is also focused into a fan-shaped beam 162 at an angle to fan-shaped beam 164. The two fan-shaped beams 162, 164, intersect at a point 170 that is outside the housing 110. The beams 162 and 164 may intersect at any desired angle, depending on the orientation of the mirror 153 and the lenses 155, 157, relative to one another. The angle of intersection may be adjustable and/or selectable.

Figure 14:
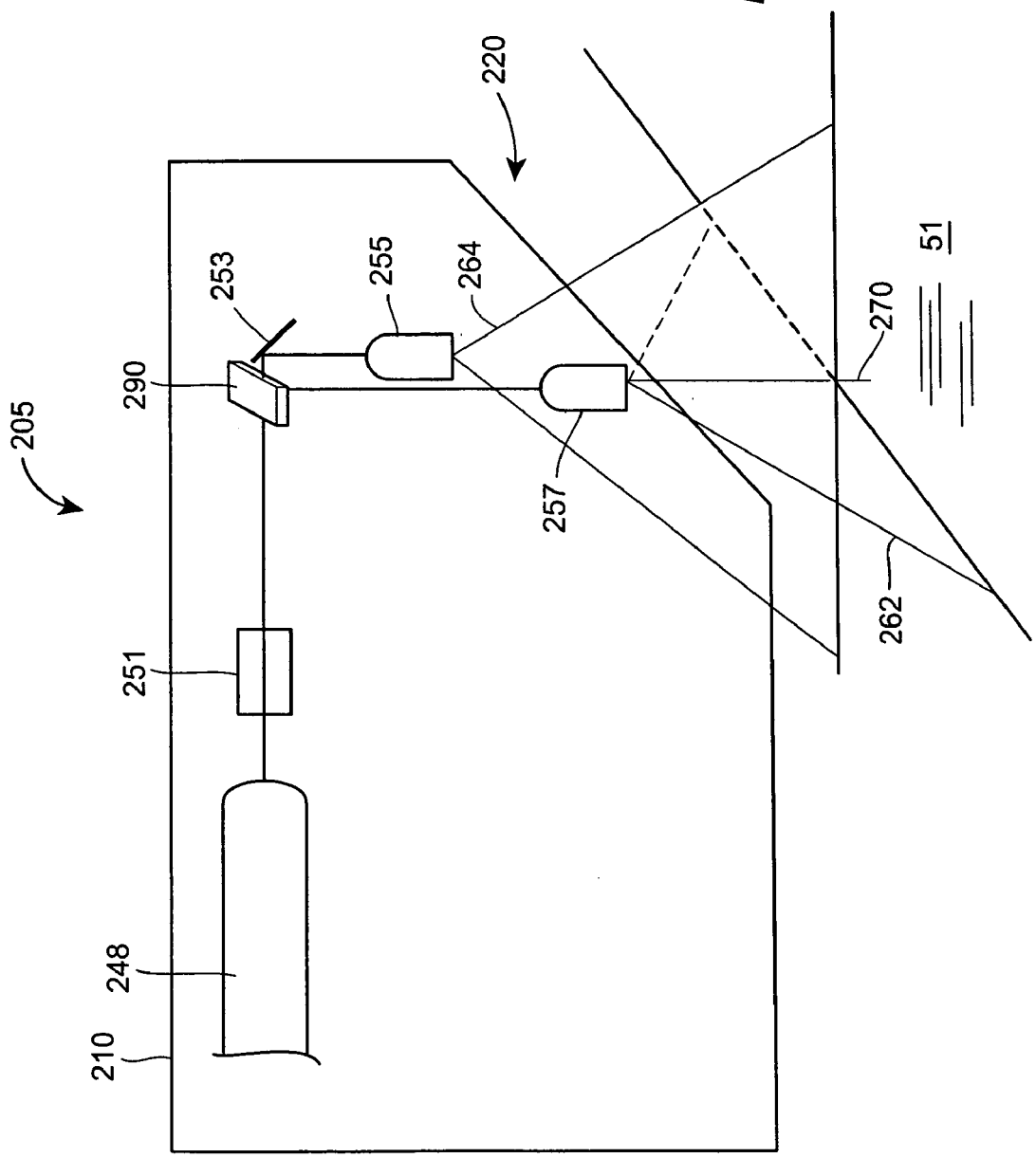
FIG. 14 is a schematic view of a second alternate embodiment of an intersecting laser line generating device.

A further embodiment of an intersecting laser line generating device 205 is illustrated in FIG. 14. In this case light generated by a single laser diode 248 may be used to generate two fan-shaped beams 262 and 264 that intersect outside a housing 210, so that a user has access to the intersection point of the two beams 270. The intersecting laser line generating device 205 includes a housing 210, having a cutout or relief portion 220 in the area in which the laser beams emerge from the housing 210. The device 205 also includes a laser diode 248 and a lens 251 that focuses light from the laser diode 248 in the manner described above, so that the light is focused when it leaves the lens 251. The light travels to a beamsplitter 290, where it is split into two beams of approximately equal intensity. The beamsplitter 290 may be a prism or a partially-reflecting mirror which allows part of the light to pass through and part of the light to be reflected. The light which passes through the beamsplitter 290 reflects from a mirror 253 and is shaped into a fan-shaped beam 264 by a lens 255. The lens 255 may be a plano-concave lens, a bi-concave lens, a cylindrical lens, or a planar-convex lens, or any other lens suitable for producing a planar or fan-shaped beam.

The light reflected by the beamsplitter 290 travels to the lens 257 and is shaped into a fan-shaped beam 262. The fan-shaped beam 262 may be at a right angle to the fan-shaped beam 264. The two fans intersect at a point 270 outside housing 210 which is accessible to users, for instance for use as an origin or a point that may be marked. Any lens which converts light from an elliptical or round shape into a fan-shaped beam may be used as the lenses 255 and 257.

Figure 15:
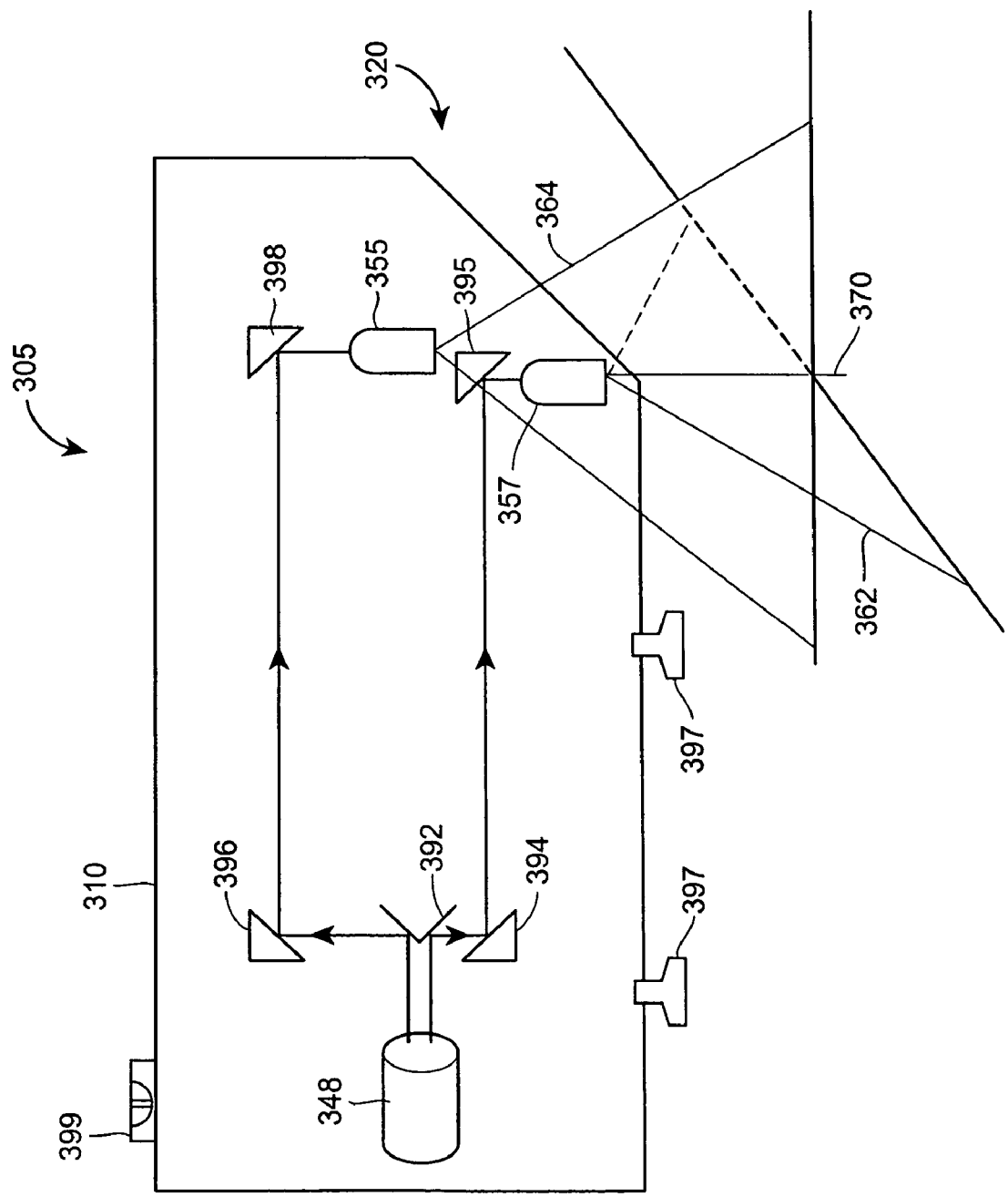
FIG. 15 is a schematic view of a third alternate embodiment of an intersecting laser line generating device.

FIG. 15 illustrates a fourth embodiment of an intersecting laser line projecting device 305, in which a single laser diode 348 is used. In this case, the focused, converging output light from the laser diode 348 impinges on a folding mirror 392 and is split into two portions. The lower portion of the laser output reflects from a second mirror 394 and a third mirror 395 and then impinges onto a lens 357. The lens 357 is a diverging lens which converts the light delivered thereto into a fan-shaped beam 362. The upper portion of the laser output reflects from a fourth mirror 396 and a fifth mirror 398 before impinging on a lens 355. The lens 355 converts the upper portion of the laser beam output into a fan shaped beam 364 which is perpendicular to a fan shaped beam 362.

The two beams are thus perpendicular and intersect at point 370, which is outside the housing 310 and which is accessible to users of the intersecting laser line projecting device 305. The housing 310 may include one or more leveling indicators, such as bubble levels 399, and may also include leveling devices, such as leveling screws 397, for adjusting the level of the housing 310. A pendulum type leveling device may be incorporated which may indicate when the device 305 is level or plumb. Although the beams intersect at a 90° angle in this embodiment, the angle of intersection may be any angle less than 180°.

If desired, typical stud finder circuitry may be incorporated into the housing of any of the above embodiments to enable the user to simultaneously find a stud, or hidden feature behind the working surface, and mark the location of the stud. The stud finder circuitry may use indicators to indicate the stud location under the work surface. By using the stud finder feature with the level indicating device, the user may project a line on the work surface indicating a stud location for the entire height of the surface. This feature would be particularly useful in mounting items which require anchoring to as stud for support (e.g. a bookcase, a cabinet, or a child gate).

Figure 20:
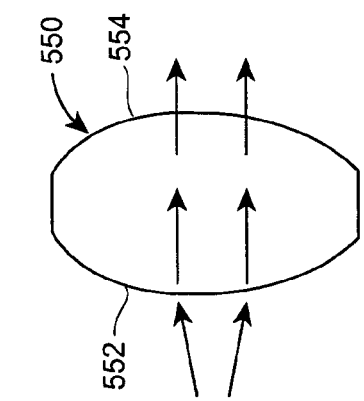
FIGS. 20–21 illustrate converging lenses useful for collimating and converging light from a light source.
Figure 21:
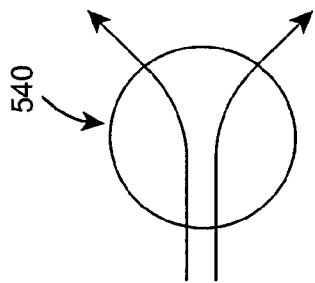

A number of lenses may be used to focus and defocus the light sources or laser light sources used in the above embodiments. FIGS. 16–19 depict some of the lenses that may be used to diverge light into a fan-shaped beam. FIGS. 20–21 depict lenses that may be used to converge, focus or collimate light from a light source, to control the spread of the light before the light is reflected by one or more mirrors, or before the light impinges on a diverging optic for formation of a fan-shaped beam. The behavior of light impinging on a lens is dependent on the focal point of the lens and the distance of the light from the lens. Thus, in some instances a cylindrical lens (a "biconvex" lens) may be converging and in other instances it may be diverging. In FIGS. 16–21, light is depicted as impinging on the lens from the left, and emerging refracted, converged, or diverged, on the right.

Figure 16:
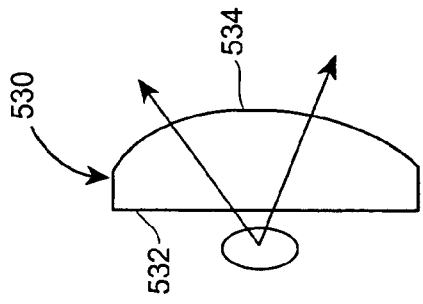
FIGS. 16–19 illustrate diverging lenses useful in creating fan-shaped beams from light incident on the lenses.
Figure 17:
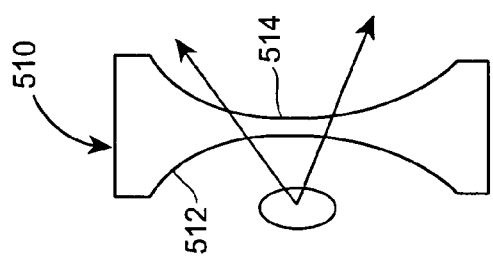

FIG. 16 depicts a plano-concave lens 500, having a concave input surface 502 and a planar exit surface 504. Light impinging on the concave input surface 502 diverges and exits from the planar exit surface 504. Plano-concave lens 500 may be used to create a fan-shaped beam from a light source entering the lens. Another lens that may be used to diverge light is a bi-concave lens 510, depicted in FIG. 17. Light enters through an input concave surface 512 and exits through an output concave surface 514.

Figure 18:
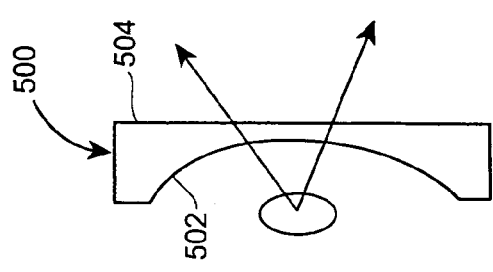
Figure 19:
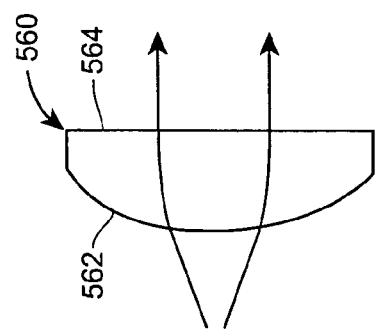

FIGS. 18–19 depict additional lenses that may be used to diverge light, such as light from a laser light source, into a fan-shaped beam. Plano-convex lens 530 may be used to diverge light entering a planar surface 532 and exiting a convex surface 534. FIG. 19 depicts a familiar cylindrical lens 540, which is well known for its ability to convert incoming light into a fan-shaped beam.

It may be useful at some point in the intersecting laser line generating device to first focus light from a light source or from a laser light source before diverging the light or forming the light into a fan-shaped beam. In FIG. 20, a bi-convex lens 550 is manufactured with two convex surfaces 552, 554. The lens 550 may also be used to converge and focus incoming light. The focal point, or most narrow point at a distance, may be set by adjusting the distance from the light source to the lens, and also of course, by adjusting the optical power of the lens. Diverging light from a light source may enter surface 552 and leave surface 554 as a focused, collimated beam on its way to a mirror or diverging lens to later be formed into a fan-shaped beam.

In FIG. 21, a convex-plano lens 560 admits diverging light into a convex surface 562 and collimates or focuses the light when it exits from a planar surface 564. The convex-plano lens 560 may be simply a mirror image of plano-convex lens 530, which provides a diverging function. In the same manner, the plano-concave lens 500 may be reversed and used to collimate or focus light rather than diverging the light into a fan-shaped beam.

Figure 22:
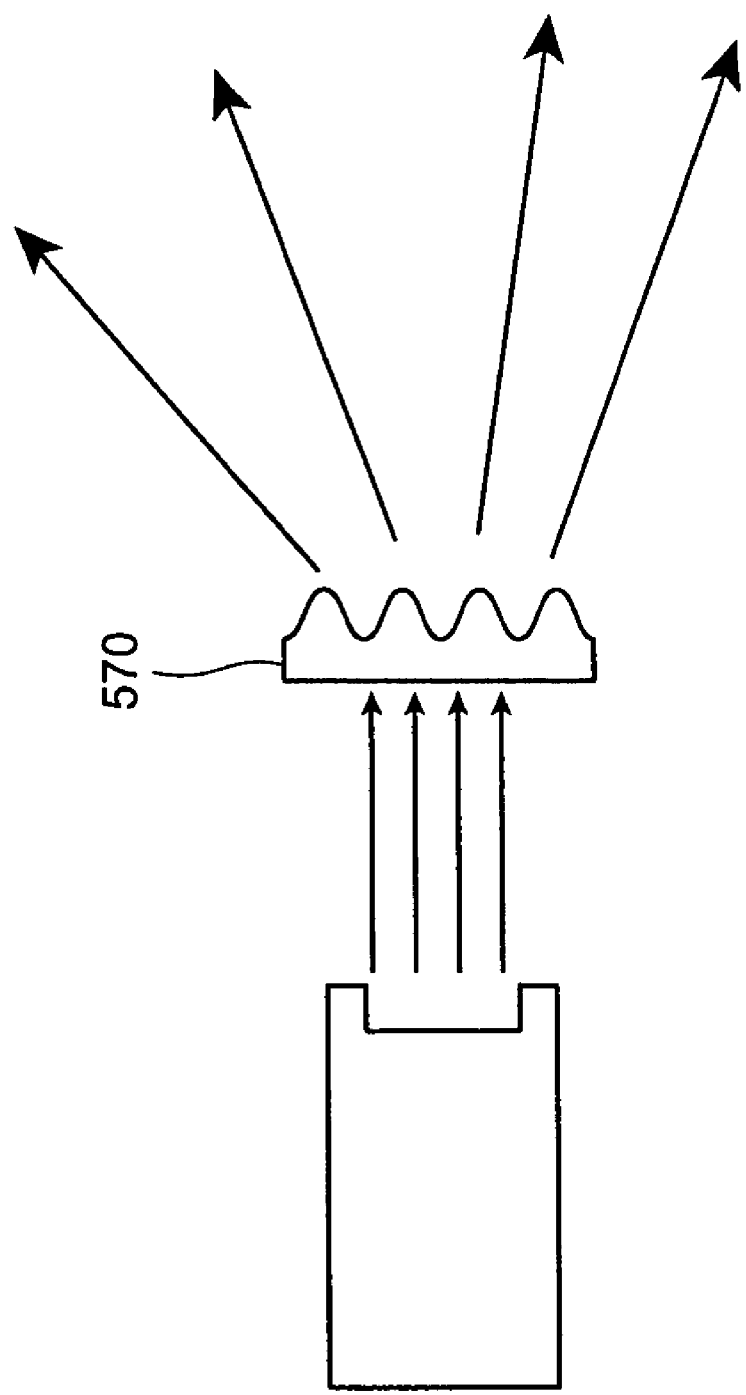
FIG. 22 is an alternate lens for generating a fan beam.

Another lens used for converting a beam of light in to a fan-beam is a "wavy" or lenticular lens 570, such as the lens shown in FIG. 22.

A number of other optical elements may be used in embodiments of a laser aligning device having two fan-shaped beams and allowing a user access to the intersection of the beams. For instance, beam-splitters may be used to separate a light beam into two portions. Beam-splitters may be simple, stationary elements, such as prisms, or they may be more elaborate optical devices, involving variable transmission rates.

While the application has been shown and described in connection with the preferred embodiments, it is apparent that certain changes and modifications, in addition to those mentioned above, may be made from the basic features of this application. While the laser line generator may be most convenient to use when mounted to a wall, it may also be mounted on a table, floor, or other flat surface, and used to project a line without being mounted on a wall. Many other variations of the invention may also be used without departing from the principles outlined above. Accordingly, it is the intention of the applicant to protect all variations and modifications within the valid scope of the present application. It is intended that the invention be defined by the following claims, including all equivalents.

What is claimed is:

1. A line generating device, comprising:
a housing having a base;
a light generator mounted within the housing;
a first lens element mounted within the housing to receive light from the light generator and adapted to project at least a first fan-shaped beam of light outside the housing substantially within a first plane; and
a second lens element mounted within the housing to receive light from the light generator and adapted to project a second fan-shaped beam of light outside the housing substantially within a second plane,
wherein the first and second fan-shaped beams intersect outside of the housing and wherein the first and second planes are perpendicular to the base.

2. The device of claim 1, including a pendulum type auto leveling mechanism.

3. The device of claim 2, wherein the pendulum type auto leveling mechanism includes an optical chassis pivotably mounted to the housing and wherein a center of gravity and a pivot axis of the optical chassis are not collocated.

4. The device of claim 3, wherein power is supplied to the light generator from at least one battery, wherein the at least one battery is operatively connected to the light generator by small gage wires attached to the optical chassis at the pivot axis of the optical chassis.

5. The device of claim 4, wherein the small gage wires coil in opposite directions.

6. The device of claim 3, including a mechanical switch selectively engageable with the auto leveling mechanism, the mechanical switch adapted to prevent movement of the optical chassis when engaged.

7. The device of claim 3, further including a damping mechanism for damping oscillations of the optical chassis.

8. The device of claim 7, wherein the damping mechanism includes one or more magnets.

9. The device of claim 1, wherein the first and second fan-shaped beams are projected normal to each other.

10. The device of claim 1, including a plurality of openings in the housing through which the first and second fan-shaped beams exit the housing.

11. The device of claim 1, including a retractable mount disposed on the housing for securing the housing to a working surface.

12. The device of claim 11, wherein the retractable mount includes a plurality of openings for receiving one or more fasteners.

13. The device of claim 11, further including an adhesive disposed on one of the retractable mount and the base to enable the housing to be adhesively fixed to a surface.

14. The device of claim 1, including an adjusting mechanism for adjusting the aim of the light generator.

15. The device of claim 14, wherein the adjusting mechanism includes one of a spring, an adjusting screw and an elastic spacing member.

16. The device of claim 1, further including stud finding circuitry.

17. The device of claim 1, wherein the first lens element projects two fan-shaped beams of light substantially within the first plane.

18. The device of claim 17, wherein an interplanar angle of each of the two fan-shaped beams is greater than 90°.

19. The device of claim 1, wherein the second fan shaped beam has an interplanar angle greater than 90°.

20. The device of claim 1, further including at least one level indicator mounted on the housing.

21. The device of claim 20, wherein the at least one level indicator is a bubble level indicator.

22. The device of claim 1, wherein the light generator is a laser diode.

23. The device of claim 1, further including a reflective surface which reflects light from the light generator and which directs the light onto at least one of the first lens element and the second lens element.

24. The device of claim 23, wherein the reflective surface is incorporated into at least one of the first lens element and the second lens element.

25. The device of claim 1, wherein the first fan-shaped beam and the second fan-shaped beam intersect at an angle which is substantially 90°.

26. The device of claim 1, wherein the first lens element and the second lens element are formed within a single integrated lens structure.

27. The device of claim 26, wherein the single integrated lens structure includes at least one total internal reflective surface and at least one refractive surface.

28. The device of claim 27, wherein the at least one total internal reflective surface and the at least one refractive surface are adapted to impart at least a 90° planar exit angle to one of the first and second fan-shaped beams.

29. The device of claim 27, wherein the at least one total internal reflective surface and the at least one refractive surface are adapted to distribute the intensity of the one of the first and second fan-shaped beam unevenly.

30. The device of claim 1, wherein the light generator includes a first light source and a second light source and wherein the first lens element receives light from the first light source and wherein the second lens element receives light from the second light source.

31. The device of claim 30, wherein the first light source is a first laser diode and the second light source is a second laser diode.

32. The device of claim 31, wherein the first laser diode produces a laser light beam of a different wavelength than the second laser diode.

33. The device of claim 32, wherein the first laser diode produces a laser light beam having a wavelength of approximately 635 nm and the second laser diode produces a laser light beam having a wavelength of approximately 650 nm.

34. A line generating device, comprising:
a housing having a cutout portion and a base;
at least one light generator;
a first lens element mounted within the housing to receive light from the at least one light generator and adapted to project a first fan-shaped beam of light outside the housing substantially within a first plane; and
a second lens element mounted within the housing to receive light from the at least one light generator and adapted to project a second fan-shaped beam of light outside the housing substantially within a second plane, wherein the first and second fan-shaped beams intersect outside of the housing at a line that is at least partially contained within a volume of space defined by the cutout portion of the housing.

35. The device of claim 34, including a pendulum type auto leveling mechanism.

36. The device of claim 35, including a mechanical switch selectively engageable with the auto leveling mechanism, the mechanical switch is adapted to prevent movement of the auto leveling mechanism when engaged.

37. The device of claim 34, wherein the first lens element and the second lens element are disposed relative to one another such that the first fan-shaped beam and the second fan-shaped beam are projected normal to each other.

38. The device of claim 34, including a plurality of openings in the housing through which the first and second fan-shaped beams exit the housing.

39. The device of claim 34, including a retractable mount for securing the device to a surface.

40. The device of claim 34, including stud finding circuitry disposed within the housing.

41. The device of claim 34, including at least one level indicator mounted on the housing.

42. The device of claim 34, wherein the at least one light generator is a laser diode.

43. The device of claim 34, wherein one of the first lens element and the second lens element contains at least one total internal reflective surface.

44. The device of claim 34, wherein the first lens element and the second lens element are formed within a single integrated lens structure.

45. The device of claim 30, wherein at least one of the first light source and the second light source comprises a laser diode.

46. The device of claim 34, wherein the at least one light generator comprises a first light source and a second light source.

47. The device of claim 46, wherein at least one of the first light source and the second light source is a laser diode.

48. The device of claim 47, wherein the line defined by the intersection of the first and second fan-shaped beams intersects a plane defined by the base producing a point of light which is accessible by a user.

49. A line generating device disposable on a surface, the line generating device comprising:
a housing;
a light generator mounted within the housing;
a first lens that receives light from the light generator and projects the light in a first fan-shaped beam substantially within a first plane; and
a second lens that receives light from the light generator and projects the light in a second fan-shaped beam substantially within a second plane that intersects the first plane at an angle,
wherein the first and second fan-shaped beams are projected outside the housing and intersect at an angle on the surface such that a user has access to an intersection point of the fan-shaped beams on the surface.

50. The device of claim 49, further comprising at least one level indicator mounted on the housing.

51. The device of claim 49, further comprising at least one leveling device mounted on the housing.

52. The device of claim 49, wherein the light generator includes first and second light sources and the first light source is a first laser diode and the second light source is a second laser diode.

53. The device of claim 52, wherein the first laser diode produces a laser light beam of a different wavelength than the second laser diode.

54. The device of claim 53, wherein the first laser diode produces a laser light beam having a wavelength of approximately 635 nm and the second laser diode produces a laser light beam having a wavelength of approximately 650 nm.

55. The device of claim 49, further comprising a reflective surface for reflecting light from the light generator and directing the light into the first lens.

56. The device of claim 49, wherein the first lens and the second lens are selected from the group consisting of cylindrical lenses, bi-concave lenses, plano-convex lenses and plano-concave lenses.

57. The device of claim 49, wherein the housing includes a cutout portion.

58. The device of claim 49, further comprising a converging lens between the light generator and the first lens and between the light generator and the second lens.

59. A line generating device comprising:
a housing;
a light generator and a mirror mounted within the housing;
a first lens that receives light from the light generator and projects the light in a fan-shaped beam substantially within a first plane; and
a second lens that receives light from the mirror and the light generator and projects the light in a fan-shaped beam substantially within a second plane,
wherein the fan-shaped beams are projected outside the housing and intersect at an angle on a surface, such that a user has access to an intersection point of the fan-shaped beams on the surface.

60. The device of claim 59, further comprising at least one level indicator mounted on the housing.

61. The device of claim 59, wherein the light generator is a laser diode.

62. The device of claim 59, further comprising a beamsplitter, wherein the beamsplitter receives light from the light generator and splits the light into two portions, a first portion transmitted to the first lens and a second portion transmitted to the mirror and the second lens.

63. The device of claim 59, further comprising a converging lens disposed between the light generator and at least one of the first lens and the second lens.

* * * * *